(12) United States Patent
Bennett

(10) Patent No.: US 8,997,480 B1
(45) Date of Patent: Apr. 7, 2015

(54) DRIVE ASSEMBLY AND TRANSMISSION

(75) Inventor: Michael L. Bennett, Sullivan, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 939 days.

(21) Appl. No.: 13/076,142

(22) Filed: Mar. 30, 2011

Related U.S. Application Data

(60) Provisional application No. 61/445,136, filed on Feb. 22, 2011, provisional application No. 61/319,211, filed on Mar. 30, 2010.

(51) Int. Cl.
  *F16D 31/02* (2006.01)
  *F16H 9/26* (2006.01)

(52) U.S. Cl.
  CPC .................................... *F16H 9/26* (2013.01)

(58) Field of Classification Search
  USPC .......................................................... 60/487
  See application file for complete search history.

(56) References Cited

U.S. PATENT DOCUMENTS

| | | | |
|---|---|---|---|
| 3,266,434 A | 8/1966 | McAlvay | |
| 3,626,816 A | 12/1971 | Boydell | |
| 4,819,508 A | 4/1989 | Yamaoka et al. | |
| 4,903,545 A | 2/1990 | Louis et al. | |
| 5,010,733 A | 4/1991 | Johnson | |
| 5,201,692 A | 4/1993 | Johnson | |
| 5,314,387 A | 5/1994 | Hauser | |
| 5,394,699 A | 3/1995 | Matsufuji | |
| 5,542,494 A | 8/1996 | Louis et al. | |
| 6,487,857 B1 | 12/2002 | Poplawski et al. | |
| 6,651,529 B1 | 11/2003 | Poplawski et al. | |
| 7,523,611 B2 | 4/2009 | Dong et al. | |
| 7,578,362 B1 | 8/2009 | Pollman et al. | |
| 2006/0039801 A1 | 2/2006 | Dong et al. | |
| 2007/0137918 A1 | 6/2007 | Dong et al. | |
| 2008/0120974 A1 | 5/2008 | Dong et al. | |
| 2008/0310972 A1 | 12/2008 | Dong et al. | |

*Primary Examiner* — Michael Leslie
(74) *Attorney, Agent, or Firm* — Neal, Gerber & Eisenberg LLP

(57) ABSTRACT

A drive assembly for a vehicle is provided, the vehicle having a frame, a prime mover and a pair of driven wheels. The drive assembly includes a transmission having a housing, an input shaft extending from the housing and driven by the prime mover, a pump and motor disposed on a hydraulic mounting member in the housing, the pump driven by the input shaft and correspondingly driving the motor through porting formed in the hydraulic mounting member. The transmission further includes an internal reduction gear assembly driven by the output shaft of the motor, a transmission output shaft disposed generally parallel to the motor output shaft and driven by the internal reduction gear assembly, the transmission output shaft extending from the transmission at both ends of the transmission output shaft. Each end of the transmission output shaft drives an external reduction assembly supported in part by the frame of the vehicle, the external reduction assemblies powering at least a driven wheel of the vehicle.

20 Claims, 34 Drawing Sheets

DRIVE ASSEMBLY AND TRANSMISSION

CROSS REFERENCE

This application claims the benefit of U.S. Provisional Patent Application Ser. No. 61/445,136 filed on Feb. 22, 2011 and U.S. Provisional Patent Application Ser. No. 61/319,211 filed on Mar. 30, 2010. The contents of both applications are incorporated herein by reference.

BACKGROUND OF THE INVENTION

This invention relates to drive assemblies incorporating one or more variable speed transmissions for use in driving a vehicle or other apparatus, such as a walk-behind snow thrower, brush cutter or various types of lawn mowers.

SUMMARY OF THE INVENTION

An improved drive assembly incorporating a variable speed transmission is disclosed herein. The drive assembly is mounted on a vehicle or other powered equipment, such as a snow thrower, in a manner that allows the variable speed transmission to be pivoted from a disengaged position to an engaged position. In another configuration of the drive assembly, the transmission is rigidly mounted to the frame of the vehicle. In a further configuration, two variable speed transmissions are mounted on the frame of a vehicle, such as a lawn tractor, in a fixed rather than pivoting arrangement to provide zero turn radius capability. The addition of mechanical clutches to the output shaft of each transmission provides the capability to move a temporarily unpowered vehicle. In yet another configuration, a variable speed transmission having a through-shaft output is mounted on the frame of a vehicle in a fixed manner to provide power to two drive wheels. Mechanical clutches may be added at both ends of the output through-shaft, or at various locations in associated gear trains, to provide clutch-enabled steering and to enable movement of a temporarily unpowered vehicle.

A better understanding of the objects, advantages, features, properties and relationships of the invention will be obtained from the following detailed description and accompanying drawings which set forth illustrative embodiments that are indicative of the various ways in which the principles of the invention may be employed.

DETAILED DESCRIPTION OF THE DRAWINGS

The description that follows describes, illustrates and exemplifies one or more embodiments of the present invention in accordance with its principles. This description is not provided to limit the invention to the embodiments described herein, but rather to explain and teach the principles of the invention in order to enable one of ordinary skill in the art to understand these principles and, with that understanding, be able to apply them to practice not only the embodiments described herein, but also other embodiments that may come to mind in accordance with these principles. The scope of the present invention is intended to cover all such embodiments that may fall within the scope of the appended claim, either literally or under the doctrine of equivalents.

Figure 24:
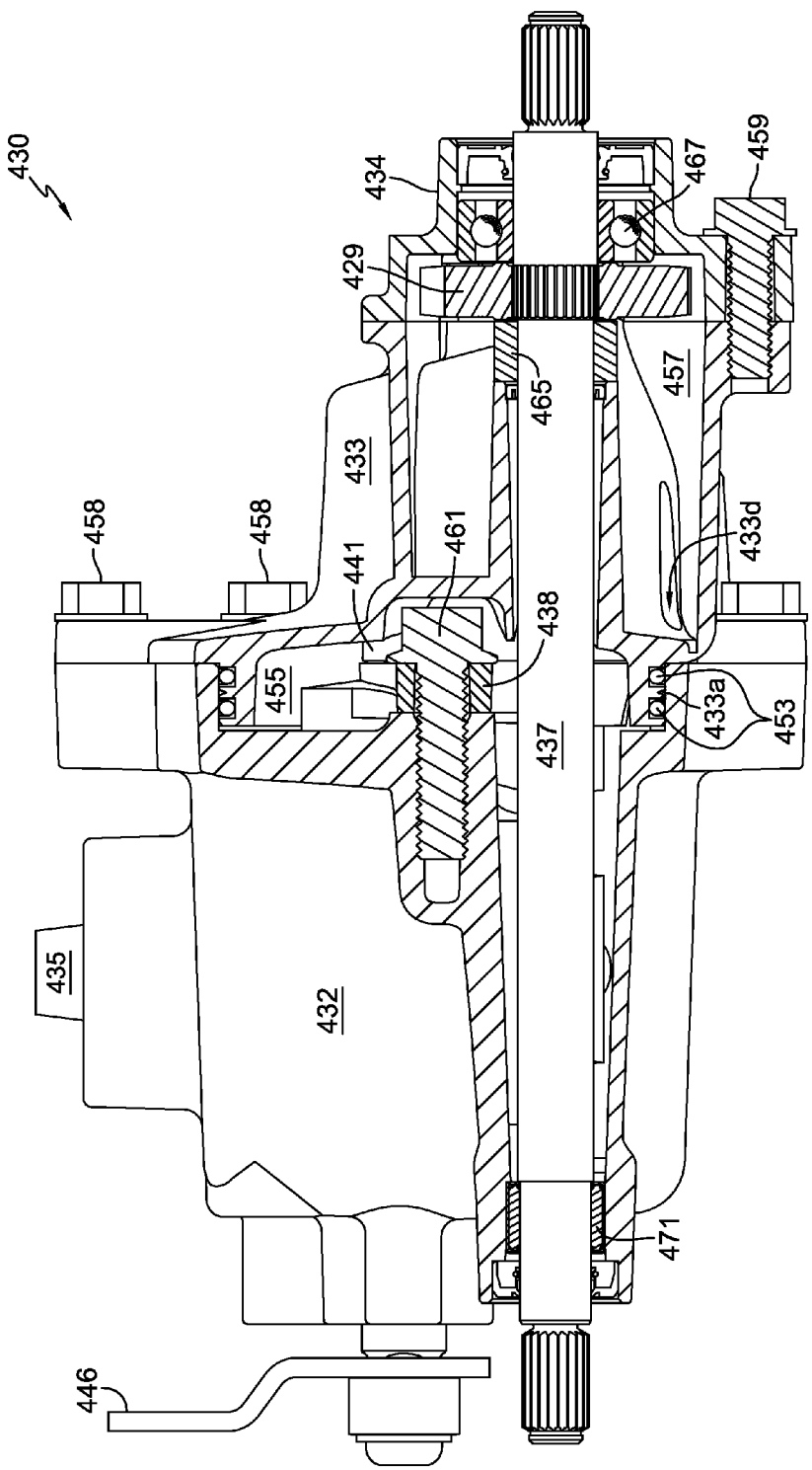
FIG. 24 is a cross-sectional view of the fourth embodiment along line 24-24 of FIG. 23.
Figure 25:
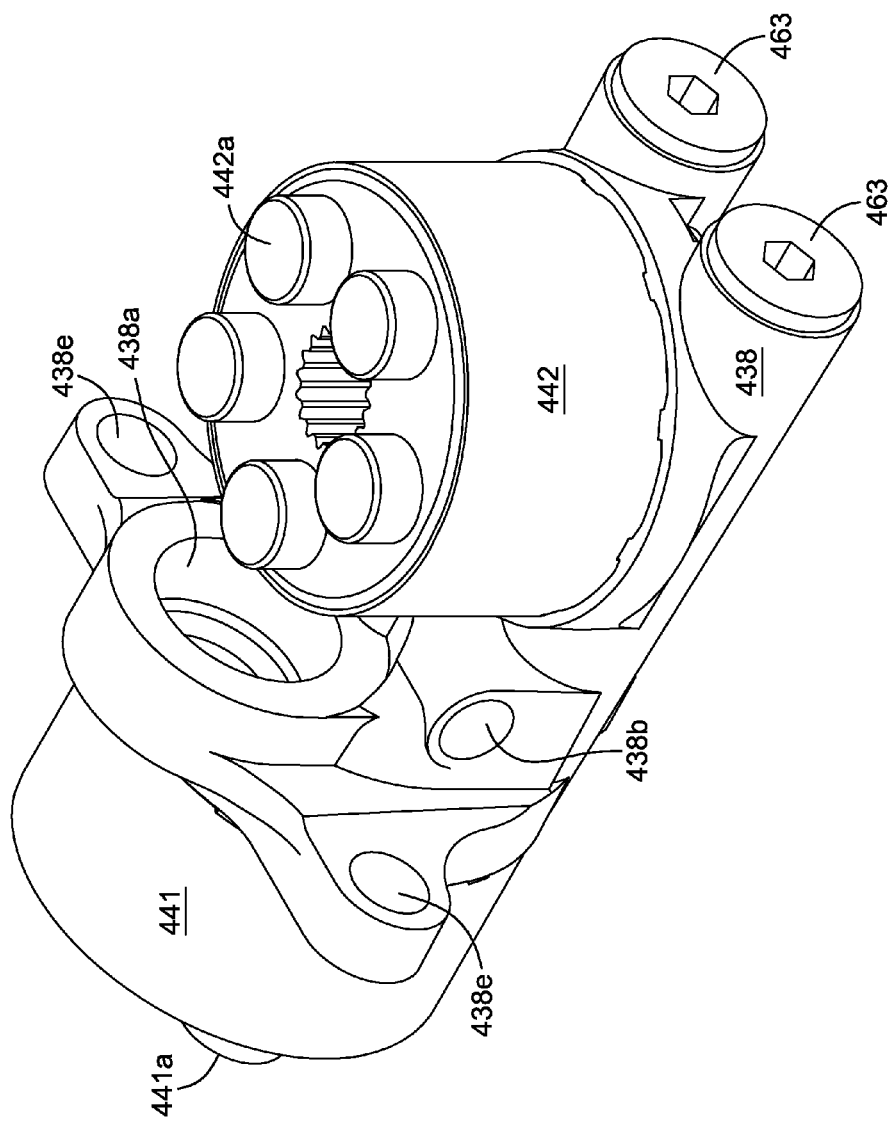
FIG. 25 is a perspective view of the center section and certain additional components of the fourth embodiment.

For clarity, the various embodiments of drive assemblies illustrated and described in accordance with the principles of the present invention are referred to herein as drive assembly "configurations," while the various transmissions incorporated into the drive assemblies are referred to herein as transmission "embodiments." It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. Certain elements that are similar to other elements but used on different sides of the drive apparatus may be labeled using "a" and "b" in addition to the reference numeral where such labeling assists in understanding the disclosure. Such labeling and drawing practices do not necessarily implicate an underlying substantive purpose. As stated above, the present specification is intended to be taken as a whole and interpreted in accordance with the principles of the present invention as taught herein and understood by one of ordinary skill in the art. Furthermore, as used herein, the terms "vertical" and "horizontal" are applied with respect to the ground or to the embodiments as illustrated and may be approximate. It will be further understood that for clarity in certain cross-sectional views, e.g., FIGS. 7 and 24, certain elements such as input shaft 35, output shaft 36 and transmission output through-shaft 437, by way of example, are not shown in cross-sectioning, as such cross-sectioning would not assist in the understanding of the invention.

Figure 1:
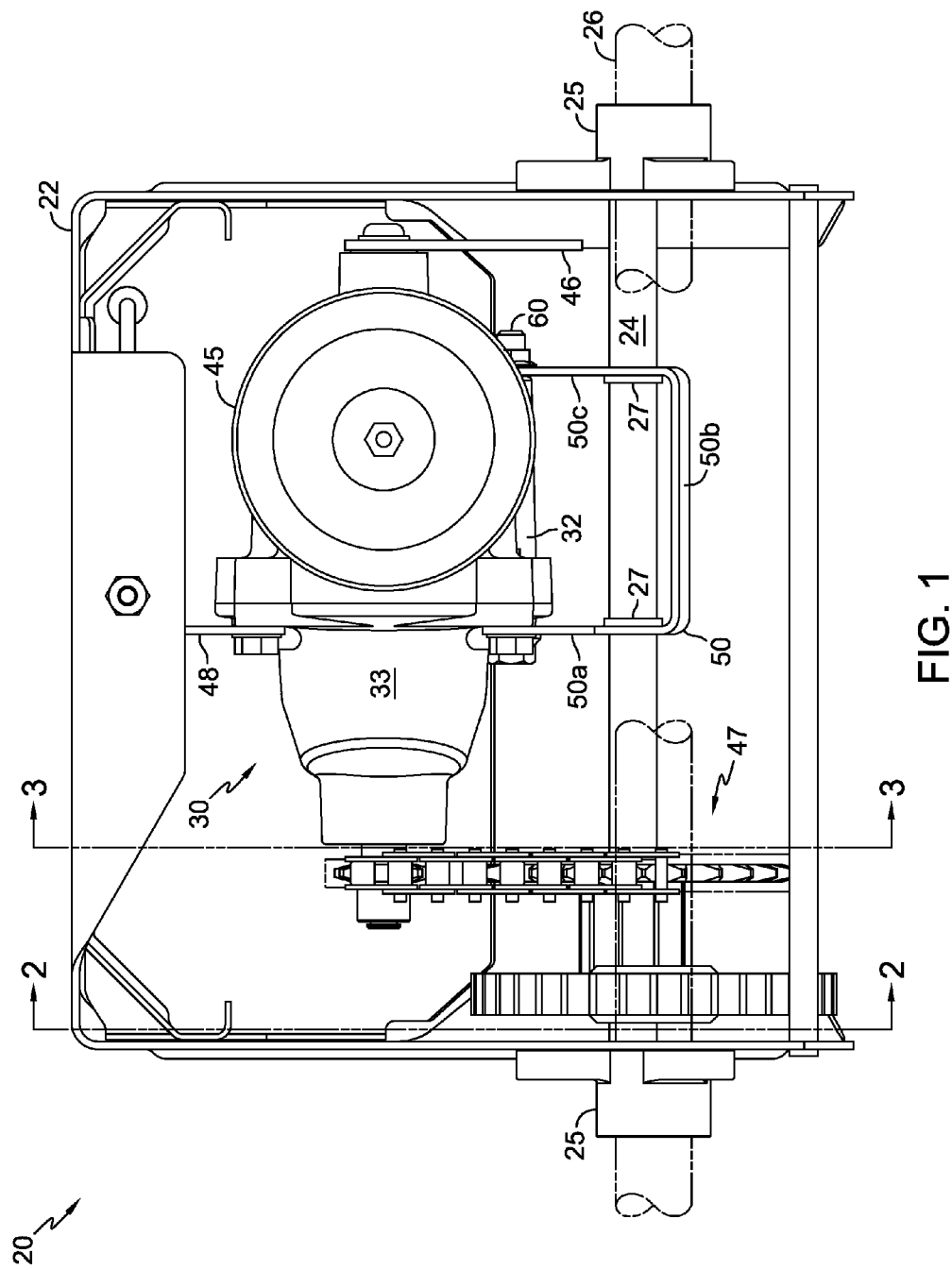
FIG. 1 is a front elevational view of a first configuration of a drive assembly in accordance with the present invention.
Figure 2:
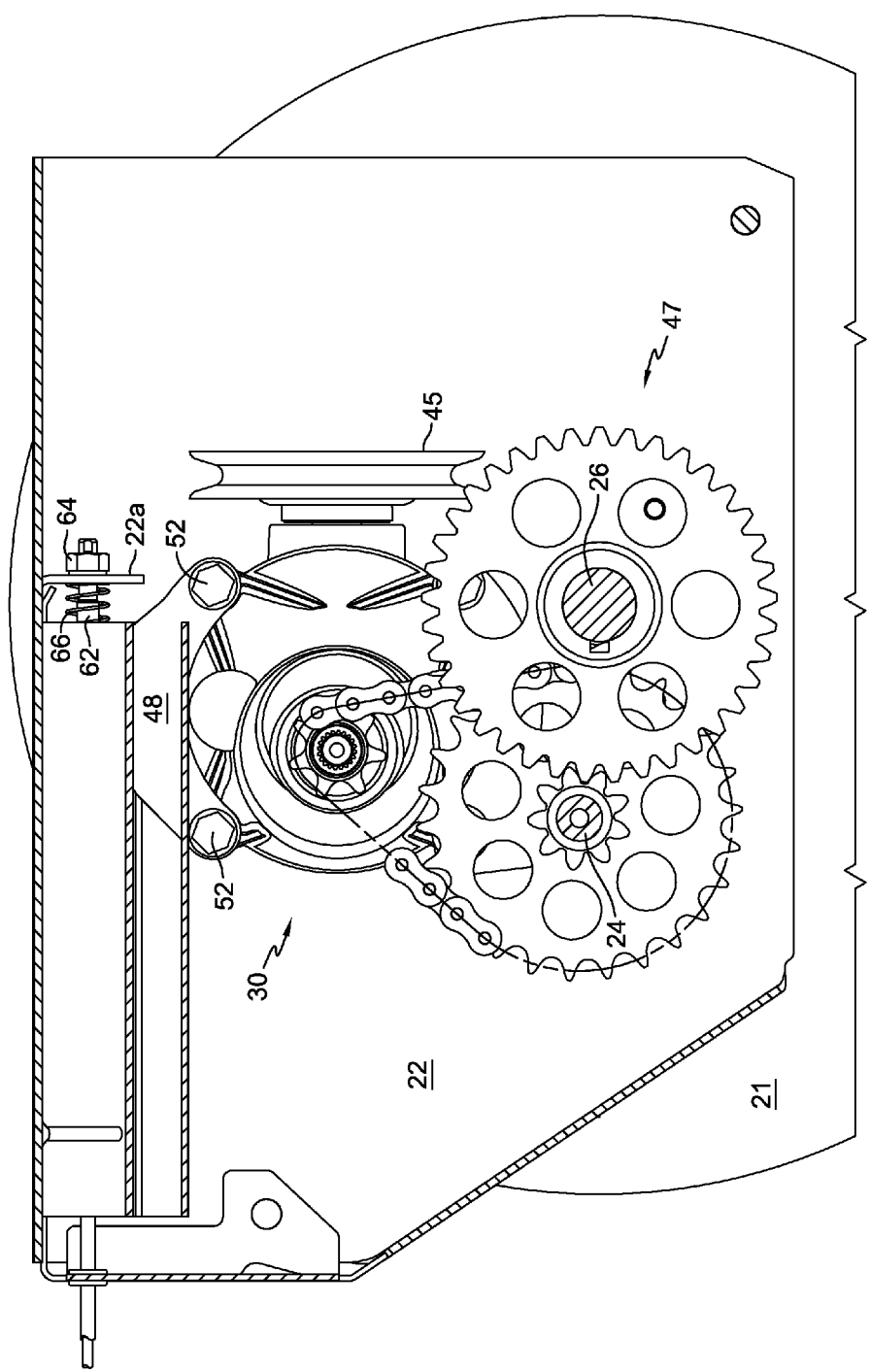
FIG. 2 is a cross-sectional view of the drive assembly of FIG. 1 along line 2-2.
Figure 3:
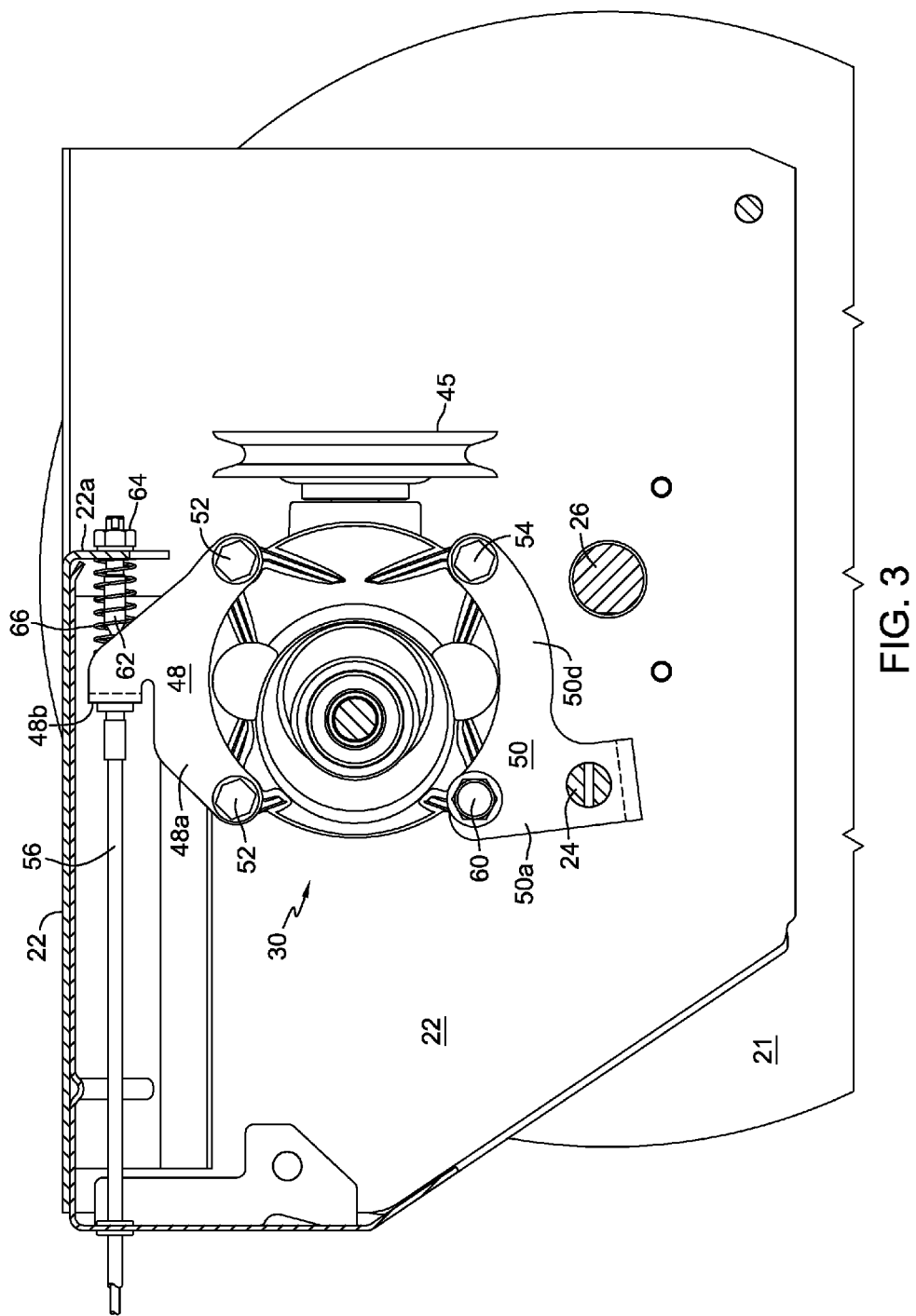
FIG. 3 is a cross-sectional view of the drive assembly of FIG. 1 along line 3-3.
Figure 4:
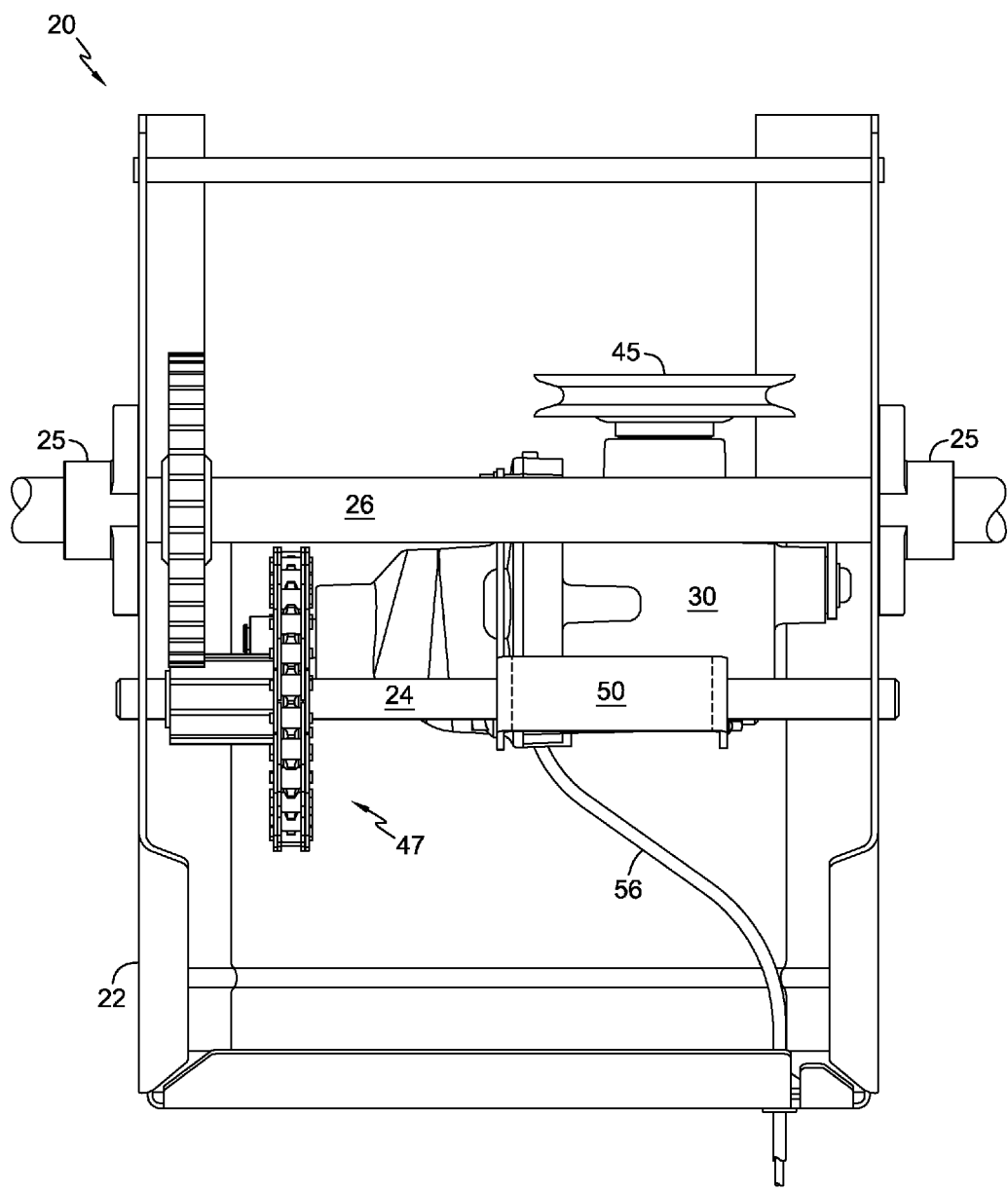
FIG. 4 is a bottom plan view of the drive assembly of FIG. 1.
Figure 5:
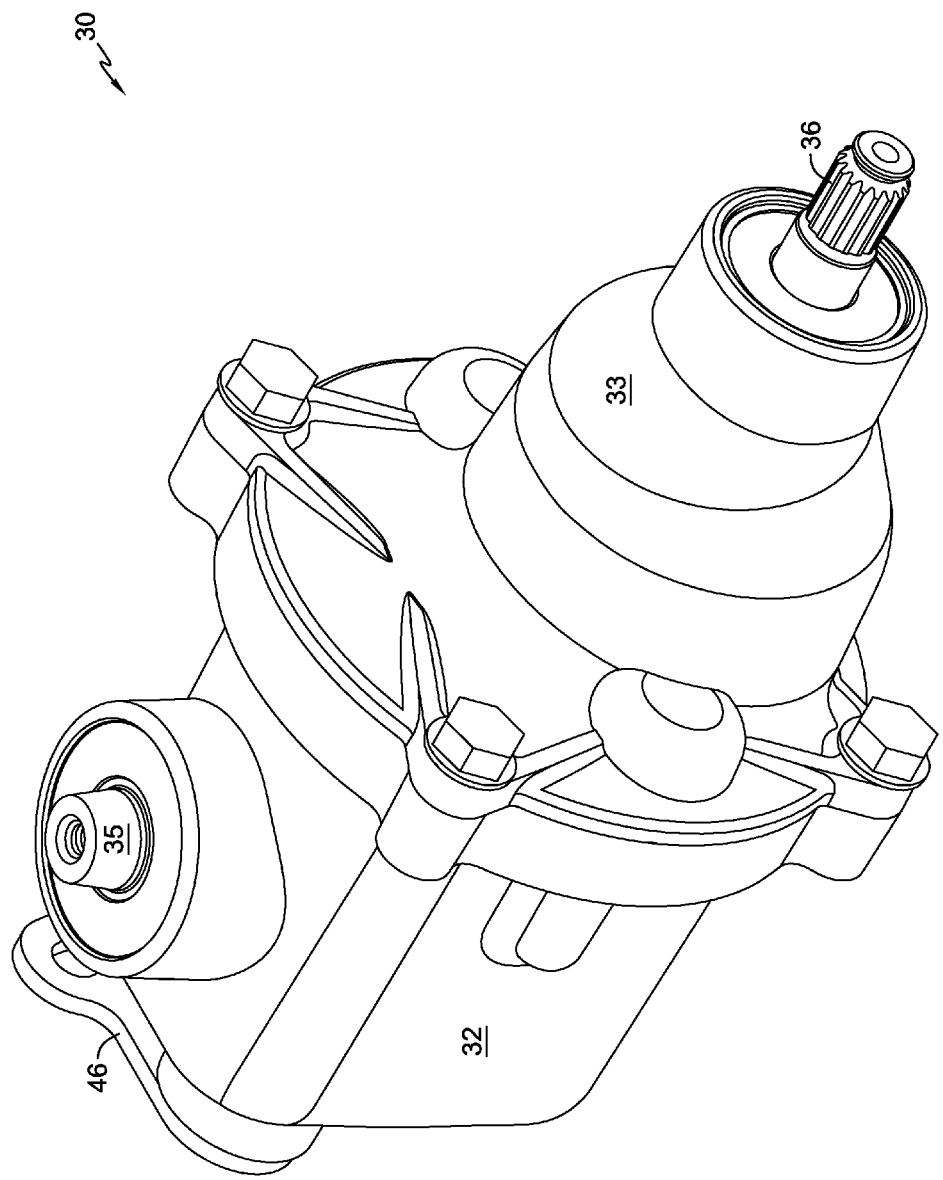
FIG. 5 is a perspective view of a first embodiment of a transmission as used in the drive assembly of FIG. 1.
Figure 6:
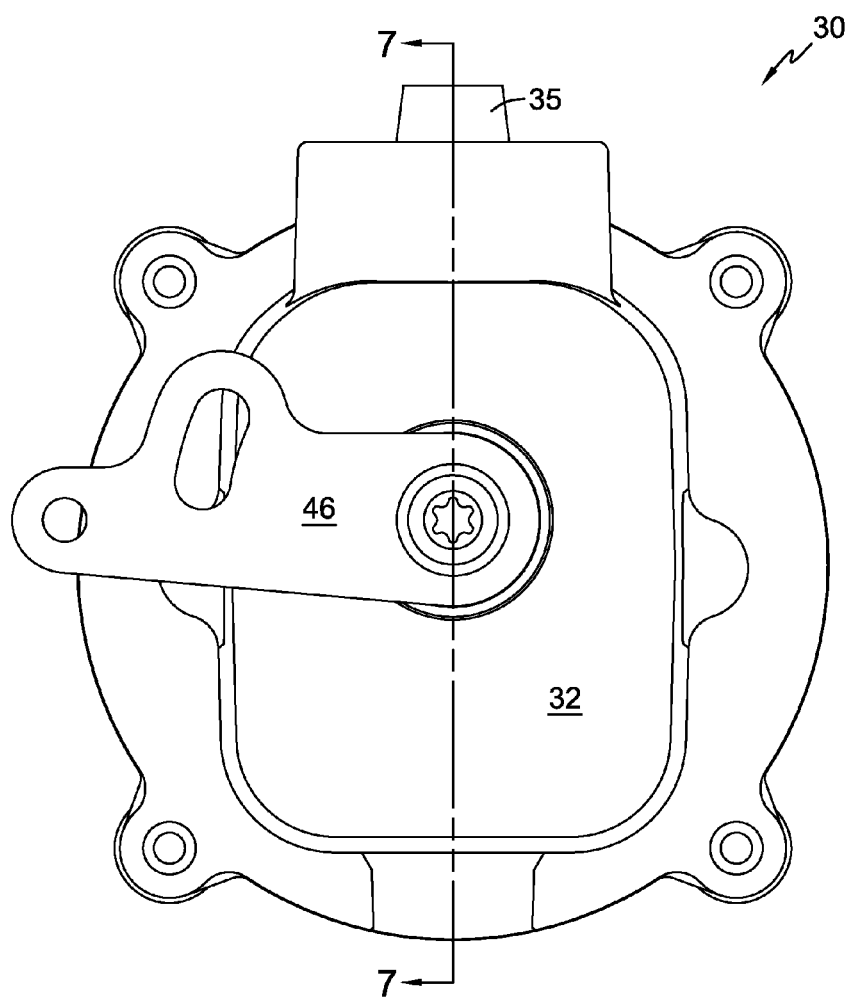
FIG. 6 is a side elevational view of the first embodiment.
Figure 16:
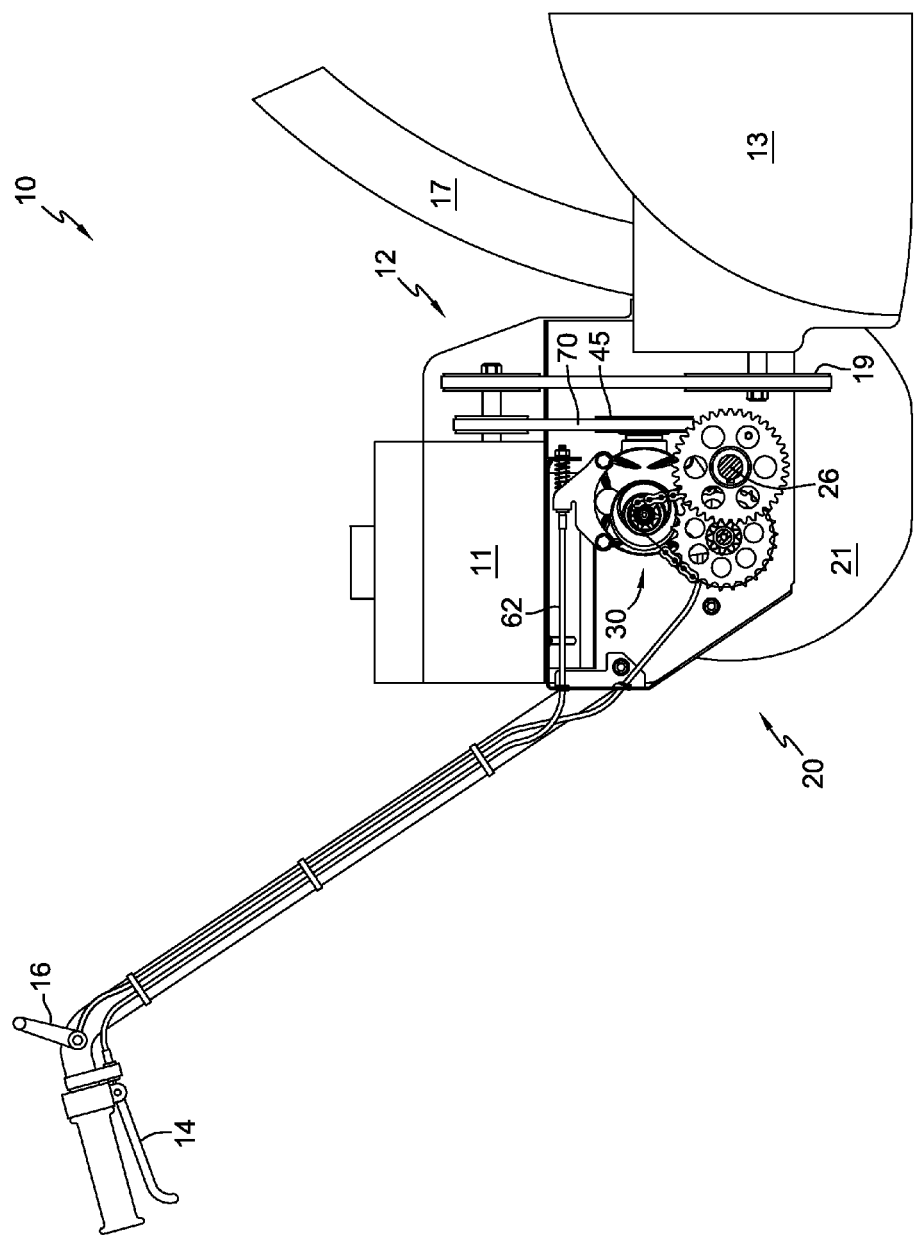
FIG. 16 is a side elevational view of a snow thrower with a portion of the frame cut away and one wheel removed for clarity, the snow thrower incorporating the drive assembly of FIG. 1.

Referring primarily to FIGS. 1, 5, and 16, a first configuration of a drive assembly 20 for a vehicle 10, shown as a snow thrower, powered by a prime mover 11, includes a first embodiment of a variable speed transmission 30 driving a single axle 26 supported by a pair of bearings 25 attached to frame 22, the axle 26 driving a pair of wheels 21 or wheel hubs (not shown). Prime mover 11 could be an internal combustion engine, electric motor or the like. Prime mover 11 may be connected to various driven systems on vehicle 10 by a pulley and belt system 12. Motive force from prime mover 11 is supplied indirectly to the input shaft 35 of variable speed transmission 30 by means of belt 70 and pulley 45. Pulley and belt system 12 may also be used to drive snow blower 13 by means of another driven pulley 19.

Vehicle 10 may also have various controls located to be operable by an operator. Lever 14 may be attached to cable 62 and used to pivot transmission 30 in and out of driving engagement with belt 70. Lever 16 may be attached to a similar cable or a linkage in order to control the speed and rotational direction of the output shaft 36 of transmission 30 via movement of control arm 46. Rotation of motor output shaft 36 is generally transferred to axle 26 through an external gearing system or gear train 47, which may include a roller chain and sprockets, or the like. Additional controls (not shown) may be provided to control the start-up and speed of prime mover 11, control a power take-off (not shown) to drive the snow blower 13, control the discharge direction of chute 17, and control other functions of vehicle 10.

As illustrated and described herein, variable speed transmission 30 is a hydrostatic transmission incorporating an axial piston pump and axial piston motor. Hydrostatic transmissions of this type are described generally in, e.g., commonly-owned U.S. Pat. No. 5,314,387. A hydrostatic transaxle design used in a snow thrower is shown in commonly-owned U.S. Pat. No. 6,651,529. Both of these patents are incorporated herein by reference. It should be understood, however, that other variable speed drives, such as toroidal, friction and mechanical drives, having similar input shaft, output shaft and control orientations may, in accordance with the principles of the present invention, be used in the various drive assembly configurations depicted herein.

Figure 7:
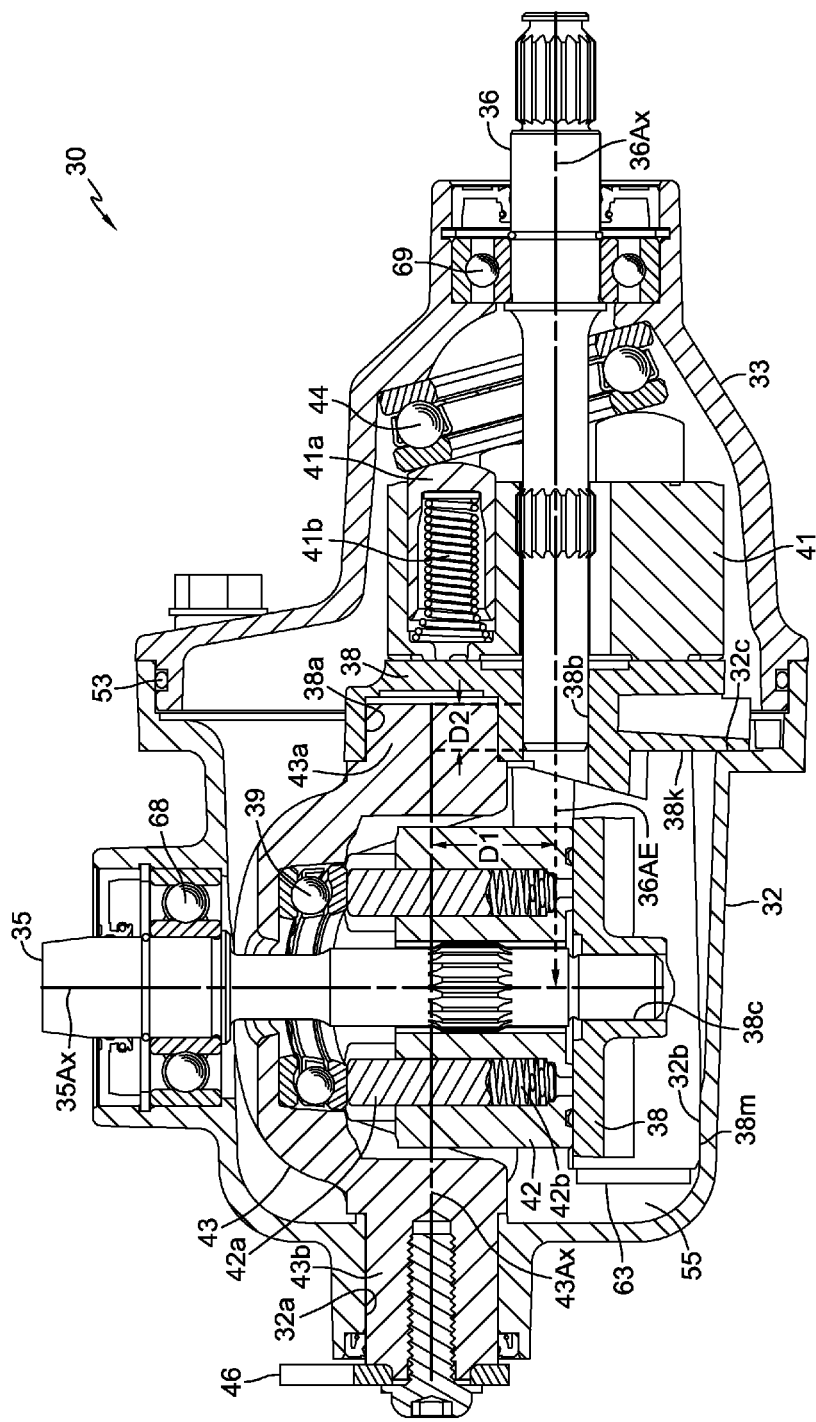
FIG. 7 is a cross-sectional view of the first embodiment along line 7-7 of FIG. 6.
Figure 8:
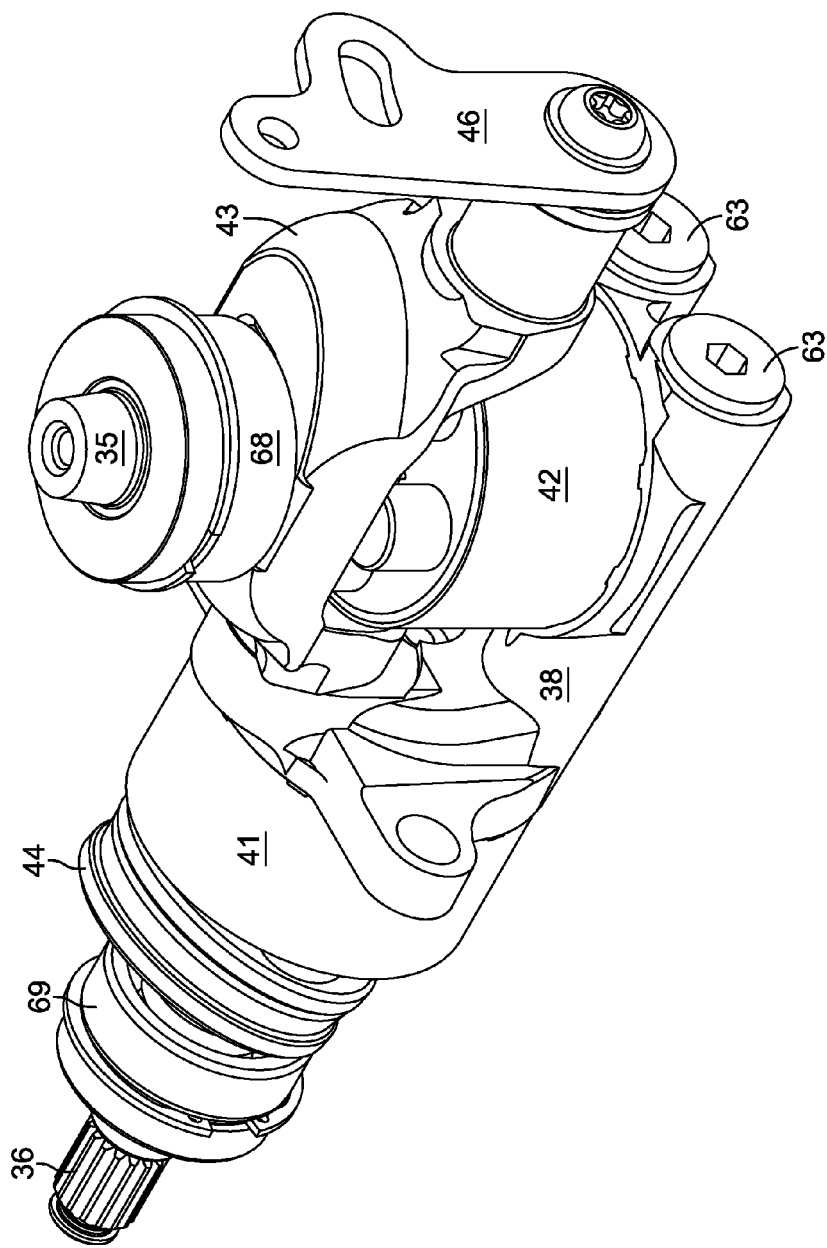
FIG. 8 is a perspective view of the internal components of the first embodiment.

Transmission 30, as shown in FIG. 7, includes an internal sump 55 formed by the joining of motor housing 33 and pump housing 32 along a vertical split line by known means, such as screws or bolts. Transmission 30 is a sealed unit with the joint between housings 32 and 33 sealed by means of o-ring 53 or other known sealing means.

As shown in FIGS. 7, 8, 11, 12 and 13, transmission 30 includes pump cylinder block 42 and motor cylinder block 41, both rotatably disposed on center section 38. Center section 38 is attached to pump housing 32 using two fasteners, such as screws 61. Only two fasteners are required because of the combination of: i) the wide-spaced arrangement of fastener openings 38g formed in ears 38h; ii) the positioning and stabilizing contact of flat surfaces 38m with the substantially horizontal flat surface (or surfaces) 32b formed in pump housing 32; and iii) the positioning and stabilizing contact of tab 38k with the substantially vertical flat surface 32c formed in pump housing 32. Furthermore, tab 38k serves to ensure proper rotational positioning of center section 38 about axis 36Ax prior to installing screws 61 via contact of flats 38l formed on tab 38k with mating surfaces of slot 32d formed in pump housing 32. These various positioning and stabilizing interfaces are preferably machined surfaces such that, when center section 38 is installed using screws 61, machined flat surfaces formed on center section 38 interface with mating machined flat surfaces of pump housing 32 to ensure accurate positioning of pump running surface 38d and motor running surface 38i relative to pump input shaft 35 and motor output shaft 36, respectively. Thus, the pump cylinder block 42 and motor cylinder block 41 engaged to these respective shafts are properly positioned on their respective running surfaces 38d and 38i, and the trunnion, motor shaft and pump shaft supports 38a, 38b and 38c, respectively, are properly aligned to prevent excessive friction or binding between the supports and their respective supported, moving components.

Referring again to variable speed transmission 30, as is known in the art, center section 38 includes hydraulic porting and passages for hydraulically connecting pump cylinder block 42 and motor cylinder block 41. Pump cylinder block running surface 38d on center section 38, with two kidney-shaped hydraulic fluid ports 38e, can be seen in FIG. 11. Motor cylinder block running surface 38i on center section 38, with two kidney-shaped hydraulic fluid ports 38j, can be seen in FIGS. 12 and 13. Check plug ports 38f are provided in the ends of the two substantially parallel fluid passage tubes 38n of center section 38 to receive check plug assemblies 63. Each fluid passage tube 38n provides fluid communication between a kidney-shaped port 38e of pump running surface 38d and a kidney-shaped port 38j of motor running surface 38i. Pump cylinder block 42 receives a plurality of pistons 42a and corresponding piston springs 42b. The pump pistons 42a remain engaged to the pump thrust bearing 39 nested in swash plate 43 as pump cylinder block 42 rotates in concert with pump input shaft 35 under the motive force of prime mover 11. The output of the pump is controlled by the position of swash plate 43 which is rotated by means of control arm 46 attached to the trunnion shaft 43b integral to swash plate 43. Similarly, motor cylinder block 41 receives a plurality of pistons 41a and corresponding piston springs 41b. The motor pistons 41a remain engaged to motor thrust bearing 44 as motor cylinder block 41 rotates in response to the fluid output of the pump. The displacement of the motor pistons 41a, and any resultant hydraulic reduction, is set by the fixed angle of the motor thrust bearing 44 supported in motor housing 33. The rotation of motor cylinder block 41 drives motor output shaft 36.

As also shown in FIG. 7, swash plate 43 is supported partially by center section 38 and partially by pump housing 32. Specifically, the trunnion-mounted swash plate 43 comprises trunnion protrusion 43a, which is rotationally supported in trunnion support 38a formed in center section 38. Trunnion-mounted swash plate 43 also comprises trunnion shaft 43b which is rotationally supported in trunnion pocket 32a formed in pump housing 32. Trunnion protrusion 43a and trunnion shaft 43b share a common rotational axis 43Ax.

Figure 11:
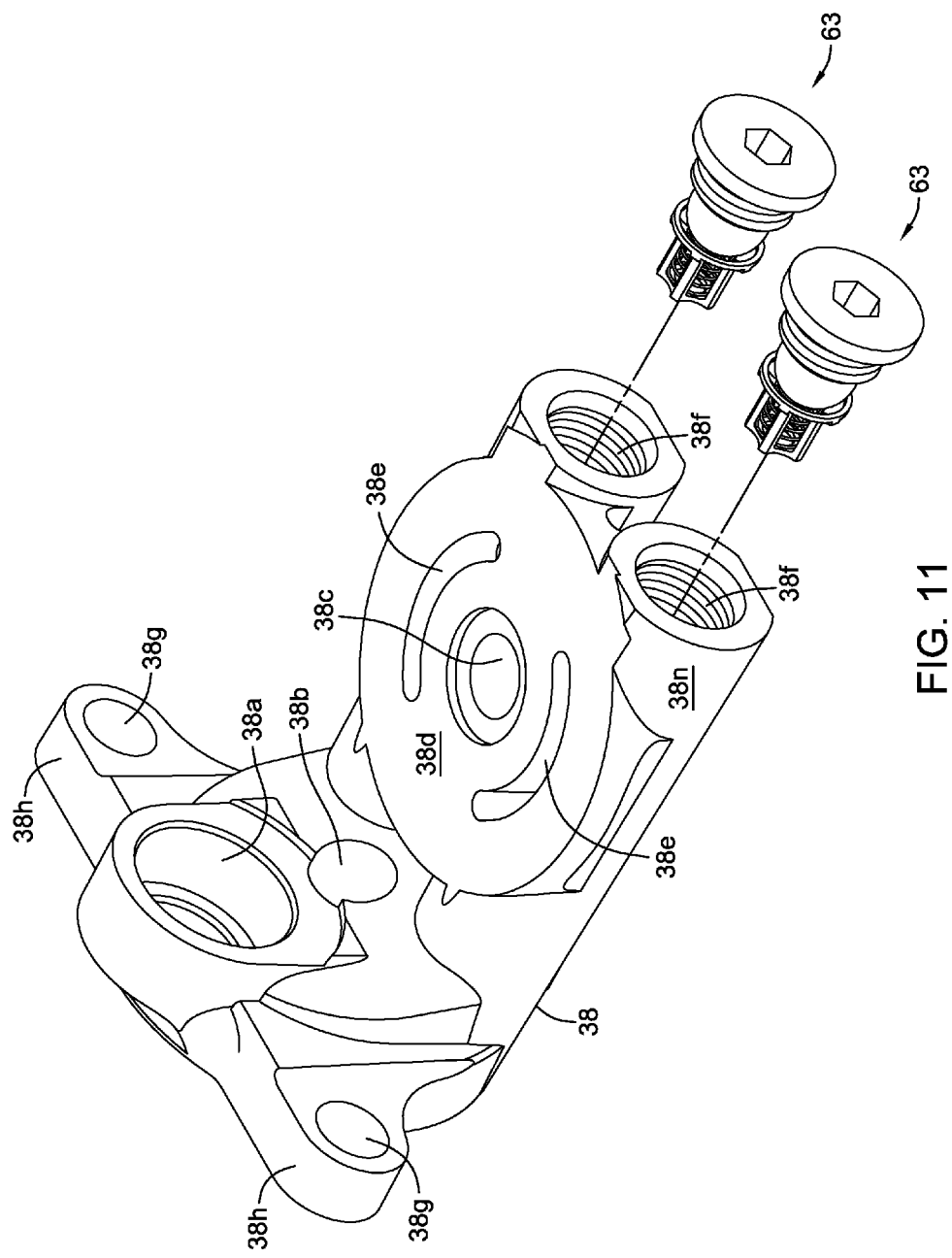
FIG. 11 is a top perspective view of the center section of the first embodiment.
Figure 12:
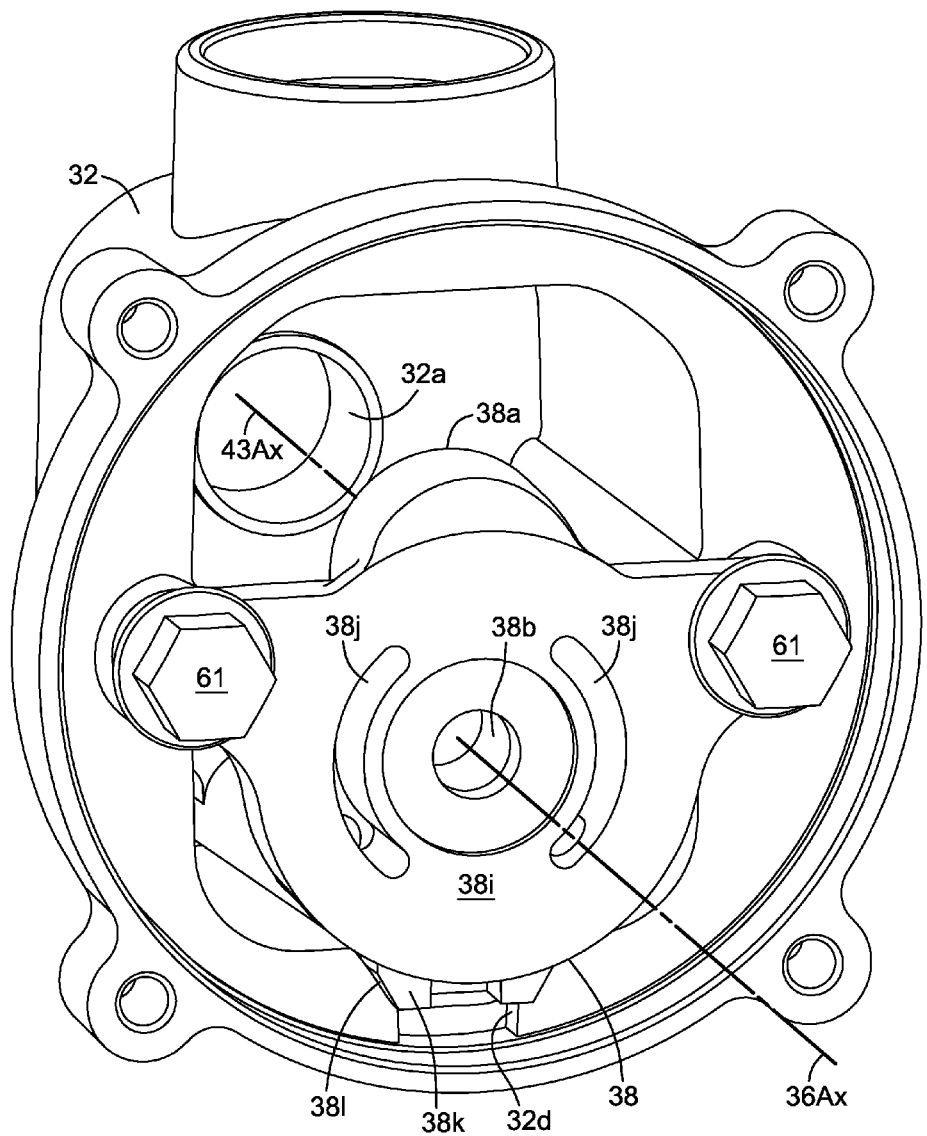
FIG. 12 is a perspective view of the center section of the first embodiment installed in the pump housing.
Figure 13:
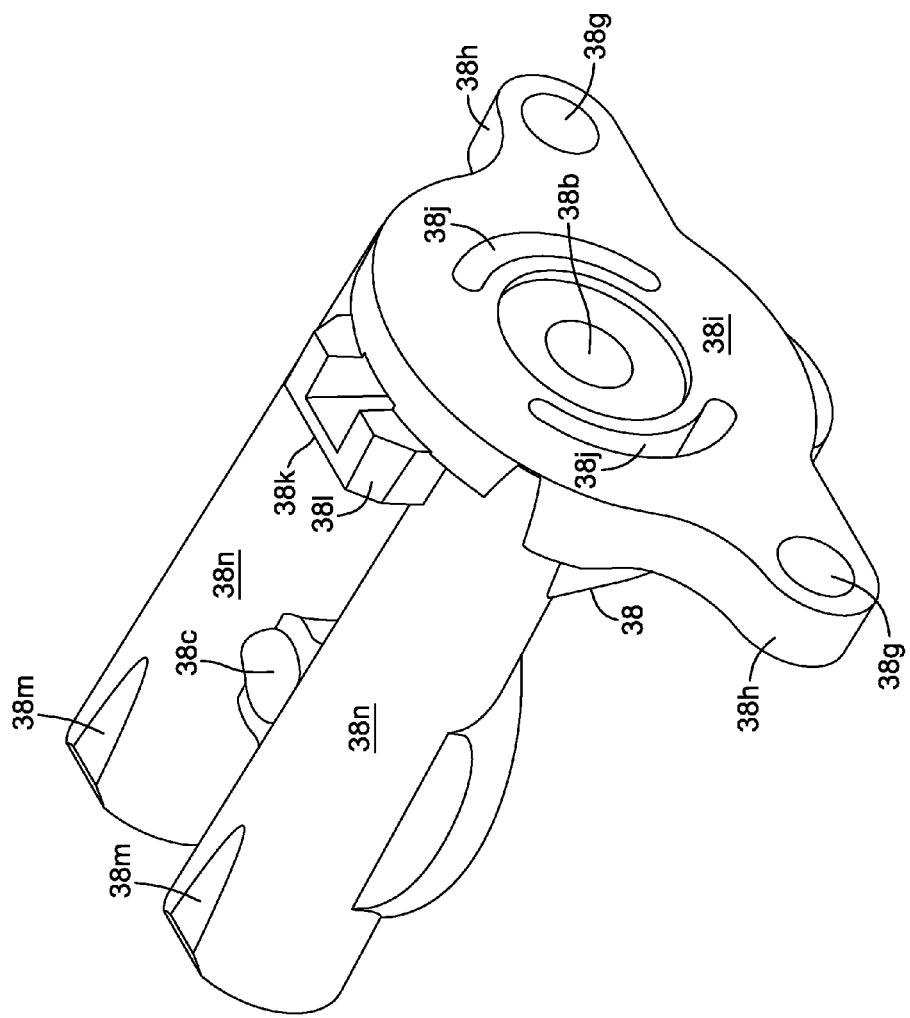
FIG. 13 is a bottom perspective view of the center section of the first embodiment.

FIGS. 7 and 11 clearly illustrate the relative positions of the trunnion support 38a and the motor output shaft support 38b formed in center section 38. Their relative positions are such that the rotational axis 43Ax of trunnion-mounted swash plate 43 and the rotational axis 36Ax of motor output shaft 36 are located on a common vertical plane (that of the cross-section depicted in FIG. 7) and are parallel to one another. Motor output shaft 36 is supported by shaft support 38b at one end and by bearing 69 proximate to its opposite end.

Similarly, pump input shaft 35 is supported at one end by pump shaft support 38c and by bearing 68 proximate to its opposite end. The support structure is such that the rotational axis 35Ax of pump input shaft 35 is located on the common plane with the rotational axes 43Ax and 36Ax of swash plate 43 and motor output shaft 36, respectively, and is oriented perpendicular to both of these axes. The arrangement of these three rotational axes within the same plane, along with the proximity of rotational axes 43Ax and 36Ax, provides for a particularly compact transmission 30. As specifically observed in FIG. 7, the rotational axis 43Ax of the swash plate 43 intersects the rotational axis 35Ax of pump input shaft 35, and the rotational axis 36Ax of the motor output shaft 36, if extended (as represented by dashed line 36AE with arrow), also intersects the rotational axis 35Ax of pump input shaft 35. The rotational axis 43Ax of swash plate 43 and the rotational axis 36Ax of motor shaft 36 are minimally offset a distance D1 and are both located above the plane of the pump running surface 38d. Additionally, motor shaft 36 and trunnion protrusion 43a overlap in the horizontal direction a distance D2, thereby further compacting the arrangement of elements.

To mount variable speed transmission 30 to frame 22, as illustrated in FIGS. 1-4, drive assembly 20 utilizes an upper mounting bracket 48, a lower mounting bracket 50, and a support shaft 24. Upper mounting bracket 48 has a first side 48a that includes openings for receiving screws 52 that attach upper mounting bracket 48 to the transmission housing, and a second side 48b substantially perpendicular to first side 48a, side 48b including an opening for receiving a cable housing 56. First side 48a is substantially perpendicular to support shaft 24 and substantially parallel to the split line along which motor housing 33 is joined to pump housing 32. Second side 48b is substantially perpendicular to the split line.

As best shown in FIG. 1, lower bracket 50 is U-shaped, having a first side 50a and a third side 50c, both of which are substantially perpendicular to support shaft 24, and a second side 50b that is substantially parallel to support shaft 24. First side 50a of lower bracket 50 has an arm 50d which includes an opening for receiving screw 54 that attaches lower mounting bracket 50 to the transmission housing near the split line. First side 50a also includes an opening for retaining the head of a bolt 60. Third side 50c of lower bracket 50 includes an opening for receiving the threaded end of bolt 60 that attaches lower mounting bracket 50 to pump housing 32 distant from the split line. It is preferable that the fasteners used to attach upper mounting bracket 48 and first side 50a of lower bracket 50 to the transmission housing be the same fasteners used to attach pump housing 32 to motor housing 33. Although screws and bolts are illustrated, studs and nuts may be substituted for these fasteners so that mounting brackets, such as upper and lower brackets 48 and 50 may be attached to transmission 30 after the assembly of transmission 30 rather than during assembly. Use of studs and nuts improves manufacturing and assembly versatility when using transmission 30 in a variety of vehicles with different transmission mounting configurations and also allows positional adjustment during attachment of transmission 30 to vehicle frames and/or other transmission mounting support structure, particularly when there is manufacturing variation from one vehicle frame to another. Each of the first and third sides 50a and 50c, respectively, of lower bracket 50, includes an opening 27 through which support shaft 24 may be inserted to extend to a receiving wall of frame 22. Alternately, other configurations of upper and lower brackets 48 and 50 may be utilized without deviating from the principles of the present invention.

As stated above, second side 48b of upper bracket 48 includes an opening where one end of cable housing 56 is securely fixed. Cable housing 56 is securely fixed at its other end to the static mount of a squeezable hand grip or other actuating mechanism, such as that of lever 14 in FIG. 16. Cable housing 56 is configured to accept through its internal length a substantially stretch-free cable 62, which is securely attached to a short vertical wall 22a of frame 22 at one end, and to a moving member of the squeezable hand grip or other actuating mechanism at an opposite end, such as lever 14 itself. Vertical wall 22a includes an opening (not shown) that receives one end of cable 62, which may be threaded for attachment with a nut or other fastener 64. A spring or biasing member 66, which extends between vertical wall 22a and second side 48b of upper bracket 48, is configured to have an interior diameter that is larger than the thickest part of the one end of cable 62, so as to encircle cable 62.

Figure 10:
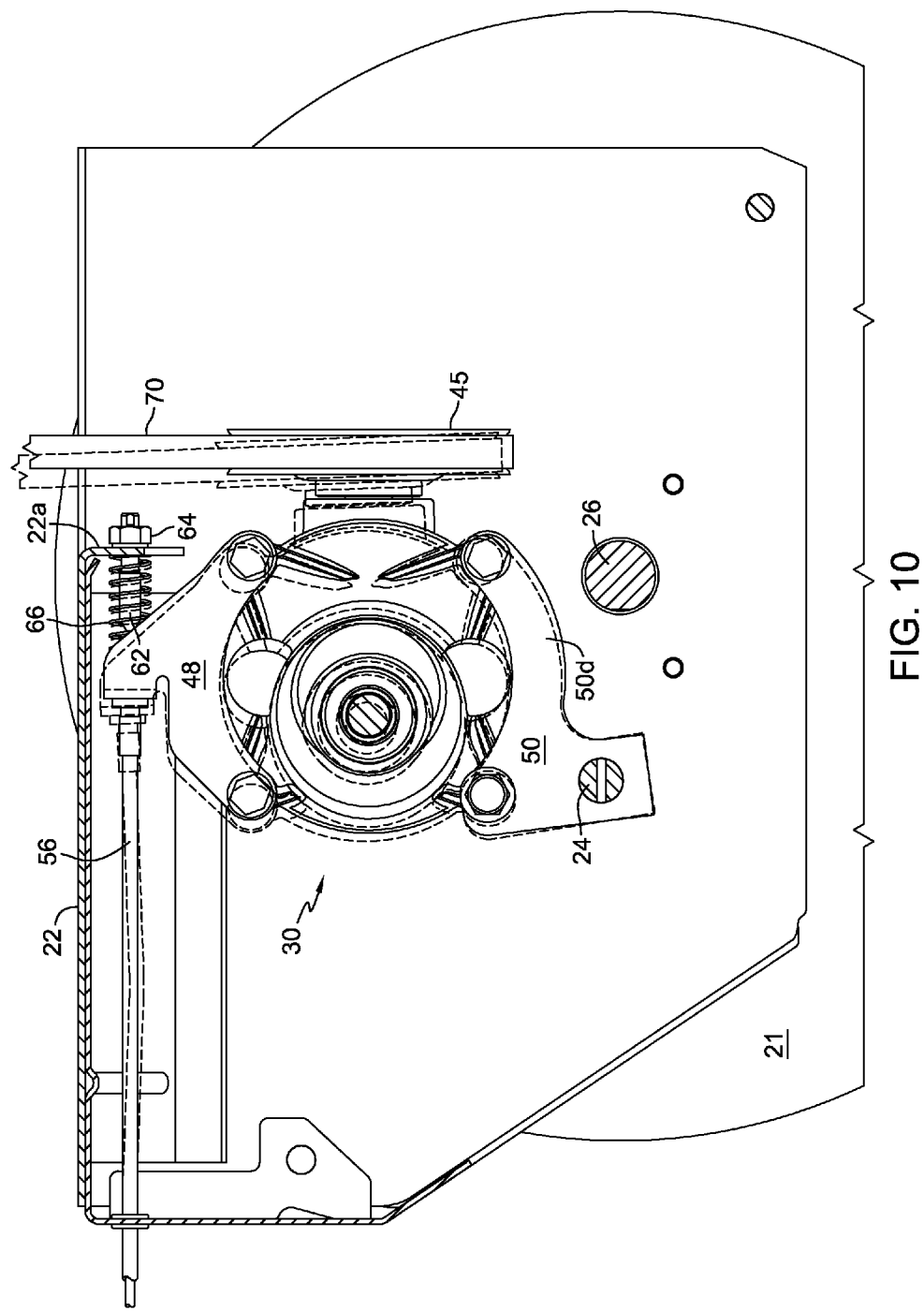
FIG. 10 is the same cross-sectional view as FIG. 3, illustrating two positions for the transmission of the drive assembly, an engaged position and a disengaged position.

Now referring to FIGS. 10 and 16, transmission drive belt 70 is shown, which connects pulley 45 to the prime mover 11, thereby supplying the motive force from the prime mover to input shaft 35. When drive engagement lever 14 is actuated by a user, cable 62 is pulled through cable housing 56, which reacts in the opposite direction to move upper bracket 48 from a first position to a second position nearer vertical wall 22a, compressing biasing member 66. Other known means, such as an electric actuator or a more complex mechanical or electro-mechanical actuation device providing additional mechanical advantage to the operator in order to reduce operator fatigue may be used in lieu of the simple mechanical actuation device illustrated.

The aforementioned movement of upper bracket 48 produces a pivoting of variable speed transmission 30 about support shaft 24, which then pushes pulley 45 into engagement with belt 70. When the prime mover is operational, the engagement of pulley 45 with belt 70 leads to the transfer of the motive force to input shaft 35 through pulley 45. In order to interrupt the rotation of input shaft 35, cable 62 is released by the user thereby returning upper bracket 48 to its first position via the action of biasing member 66, which disengages pulley 45 from belt 70.

Figure 14:
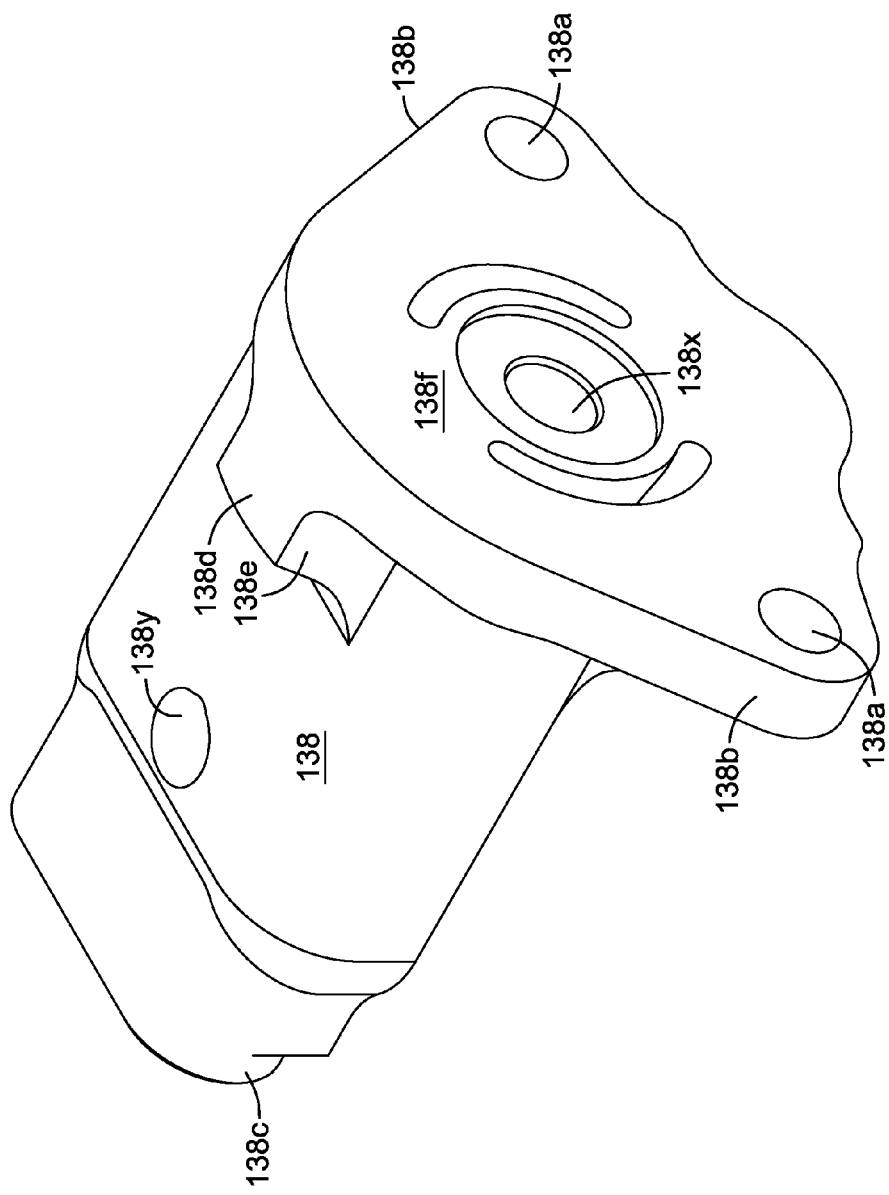
FIG. 14 is a bottom perspective view of a center section, similar to that of FIG. 13, for use in a second embodiment of a transmission.
Figure 15:
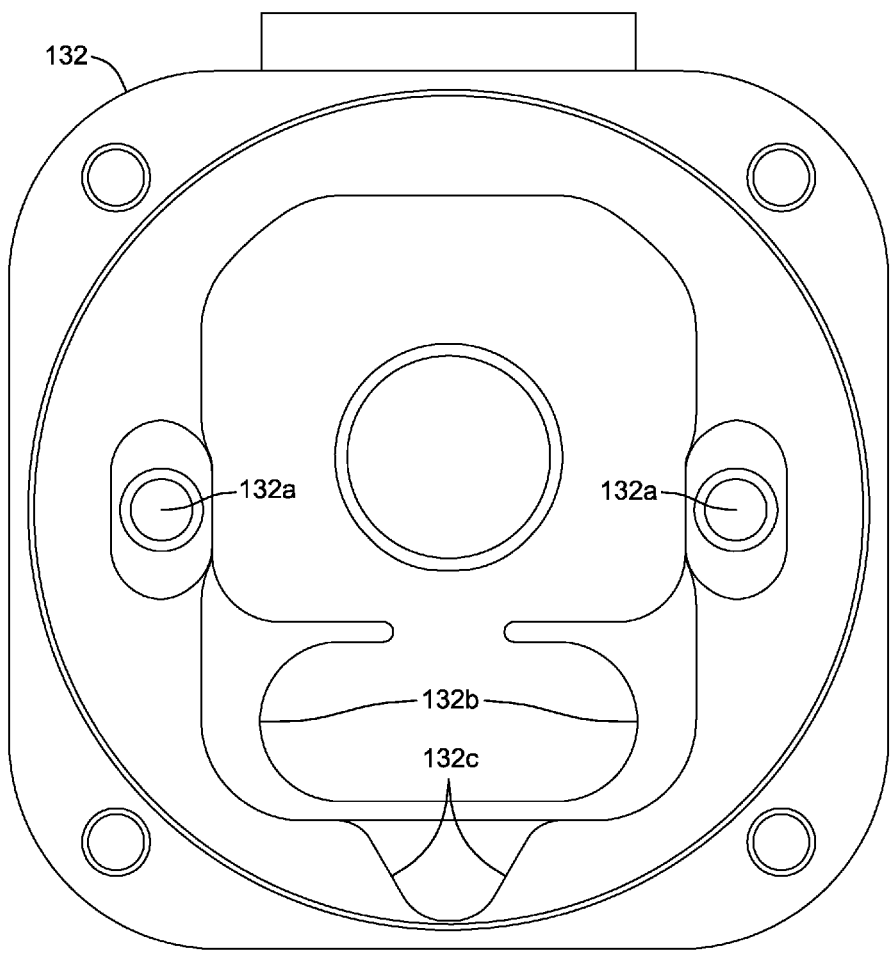
FIG. 15 is an elevational view of the pump housing of the second embodiment, formed to receive the center section of FIG. 14.

In a second embodiment of a transmission (not shown), which is otherwise substantially equivalent to first embodiment transmission 30, an alternate center section 138 and pump housing 132 is provided. Referring to FIGS. 14 and 15, center section 138, in like manner to center section 38, comprises trunnion shaft support (not shown), motor shaft support 138x, and pump shaft support 138y. Also in like manner to center section 38, center section 138 is attached to pump housing 132 using only two fasteners (equivalent to screws 61 of variable speed transmission 30) inserted through fastener openings 138a formed in ears 138b of center section 138 and engaging openings 132a formed in pump housing 132. In this embodiment, however, the center section positioning and stabilizing features, which properly align and support the center section prior to and following attachment of the center section to the pump housing, have been modified, as will now be described. One end of center section 138, distant from motor running surface 138f and having alignment profile 138c formed thereon, is inserted into a mating pocket 132b formed in pump housing 132 in order to align and support center section 138. At the same time, tab 138d formed on center section 138 proximate to motor running surface 138f ensures rotational alignment of center section 138 via contact of flats 138e formed on tab 138d with mating flats 132c formed in pump housing 132.

Figure 9:
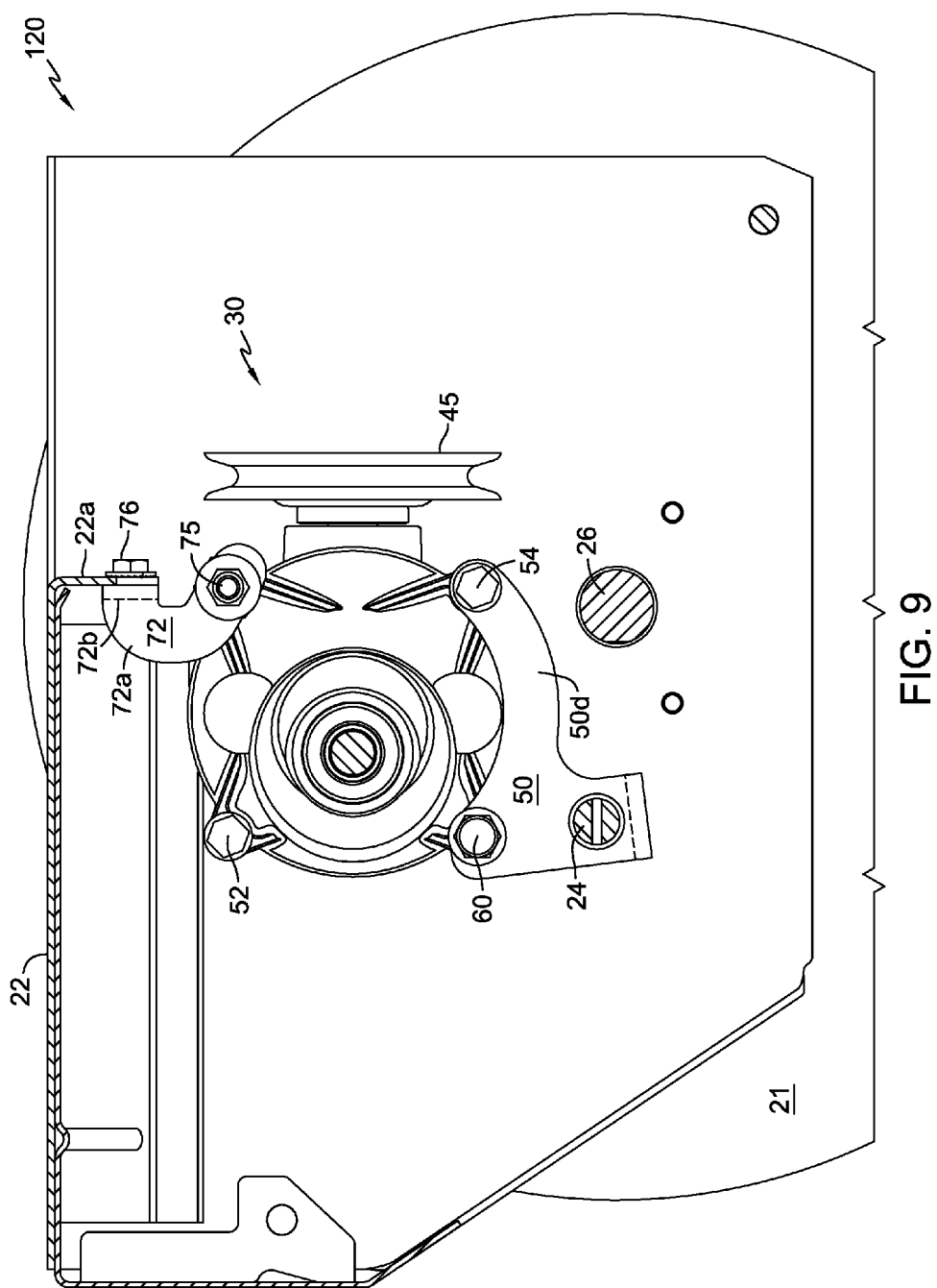
FIG. 9 is a cross-sectional view, similar to that of FIG. 3, of a second configuration of a drive assembly in accordance with the present invention.

Now referring to FIG. 9, a second configuration of a drive assembly, drive assembly 120, is shown. In this embodiment, variable speed transmission 30 is rigidly mounted to frame 22, partially by bracket 50 as in drive assembly 20 and partially by an alternate C-shaped upper bracket 72, rigidly connecting transmission 30 to the vertical wall 22a of frame 22. Upper mounting bracket 72 has a first side 72a that includes at least one opening for receiving bolt 75 that securely attaches upper mounting bracket 72 to the transmission housing, and a second side 72b that is substantially perpendicular to first side 72a and includes an opening for receiving bolt 76 that securely attaches mounting bracket 72 to vertical wall 22a of frame 22. Similar to upper bracket 48, first side 72a of bracket 72 is substantially perpendicular to support shaft 24 and substantially parallel to the split line along which motor housing 33 is joined to pump housing 32, and second side 72b is substantially perpendicular to the split line. The transmission 30 mounting solutions shown in drive assembly 20 and drive assembly 120 are interchangeable without modification to frame 22.

Figure 17:
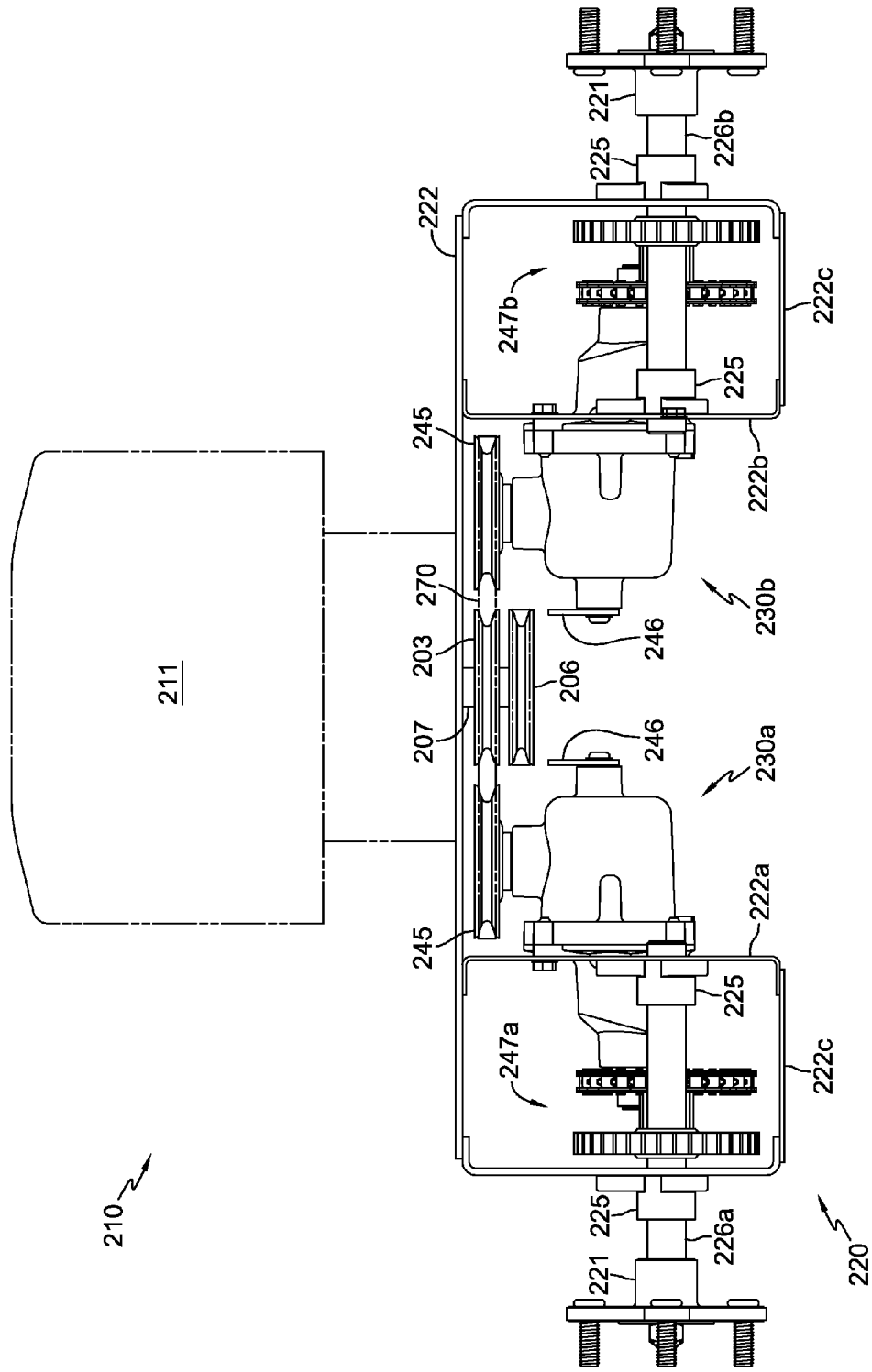
FIG. 17 is an elevational view of a third configuration of a drive assembly illustrated as a portion of a zero turn radius vehicle incorporating two of the transmissions of FIG. 5, each driving a two-stage reduction gear set.

Referring now to FIG. 17, a third configuration of a drive assembly 220 is illustrated as a portion of a zero turn radius vehicle 210 incorporating two fixed-mounted transmissions 230a and 230b, each of which may be the same as or substantially similar to variable speed transmission 30. Output shaft 207 of prime mover 211 extends through frame 222 to drive the input pulleys 245 of transmissions 230a and 230b via pulley 203 and belt 270. The output speed and direction of each transmission 230a and 230b is controlled individually via mechanical linkages (not shown) connected between operator controls (not shown) and control arms 246 to enable zero turn radius capability. Optionally, electrical linear or rotary actuators (not shown) may be employed in lieu of mechanical linkages to individually operate (or replace, in the case of rotary actuators) control arms 246. As illustrated, a pulley 206 may also be driven by output shaft 207 for purposes of driving a mowing deck (not shown) or other equipment (not shown) of vehicle 210. Transmissions 230a and 230b drive two-stage reduction gear trains 247a and 247b, respectively, each of which is similar to gear train 47 of drive assembly 20. Gear trains 247a and 247b drive axles 226a and 226b, respectively, with each axle supported by a pair of bearings 225 attached to frame 222 and each driving a wheel or wheel hub 221. Vertical brackets 222a and 222b of frame 222 are provided to rigidly mount transmissions 230a and 230b, respectively, and also to support each of the two inboard axle bearings 225. As shown, bottom plates 222c may be added to create a box beam structure in conjunction with other frame elements in order to increase frame strength and protect the gear train. Additional frame or gear train guard elements (not shown) can be added to partially or completely enclose the gear train to preclude contamination and prevent any undesired contact with the gear train.

Figure 18:
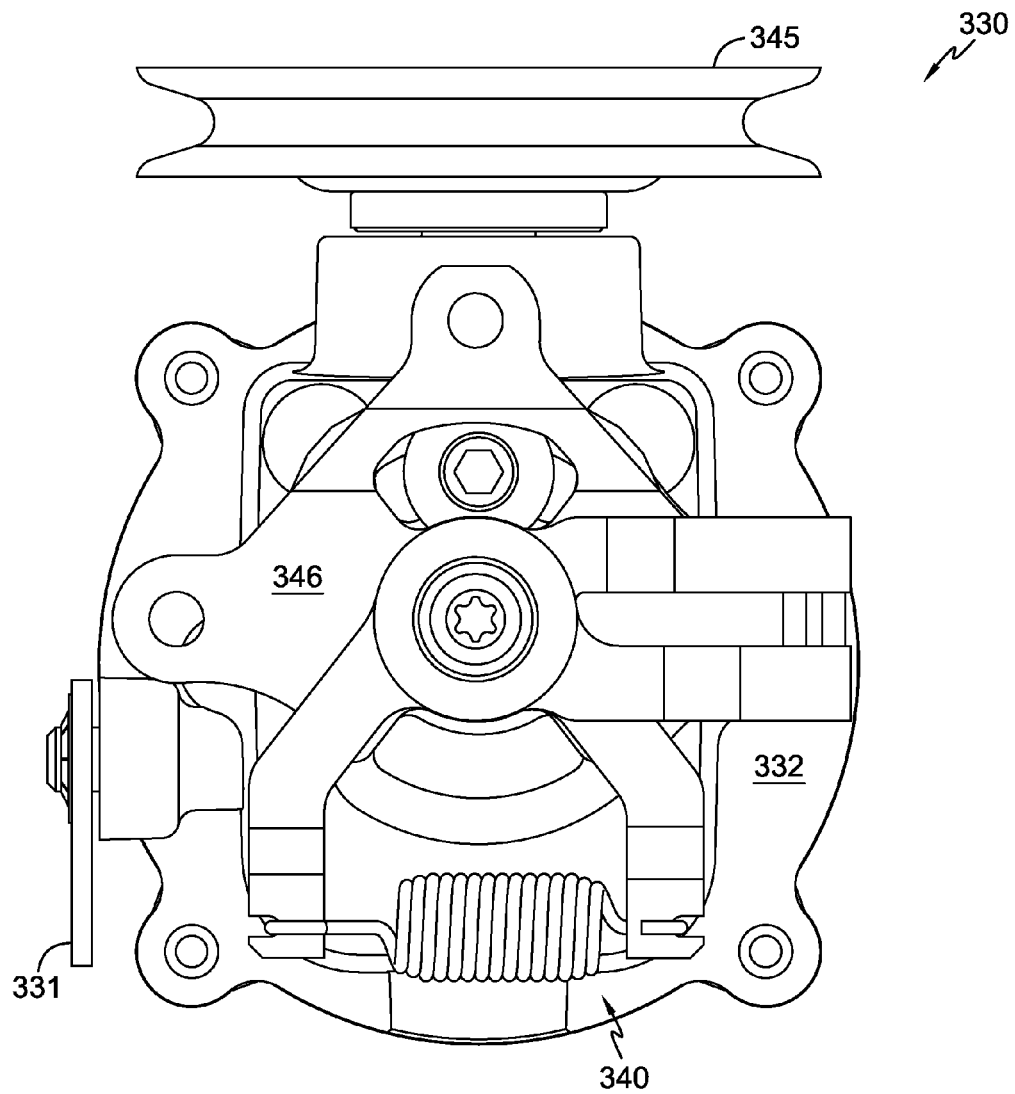
FIG. 18 is a side view of a third embodiment of a transmission similar to the first embodiment, but also having a return-to-neutral mechanism and a block-lift bypass mechanism.
Figure 19:
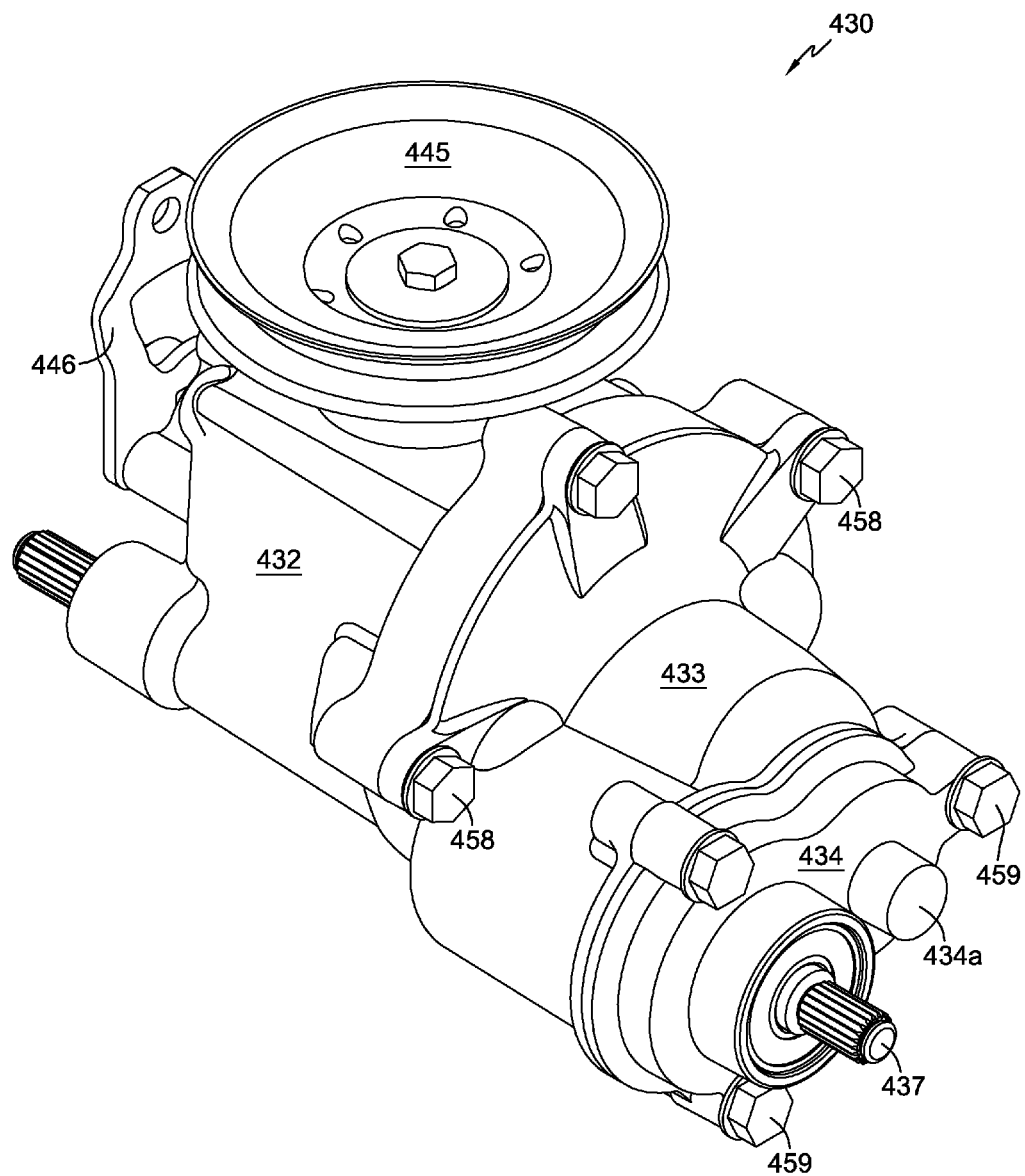
FIG. 19 is a perspective view of a fourth embodiment of a transmission similar to the first embodiment, but having an internal gear reduction driving an output through-shaft.
Figure 20:
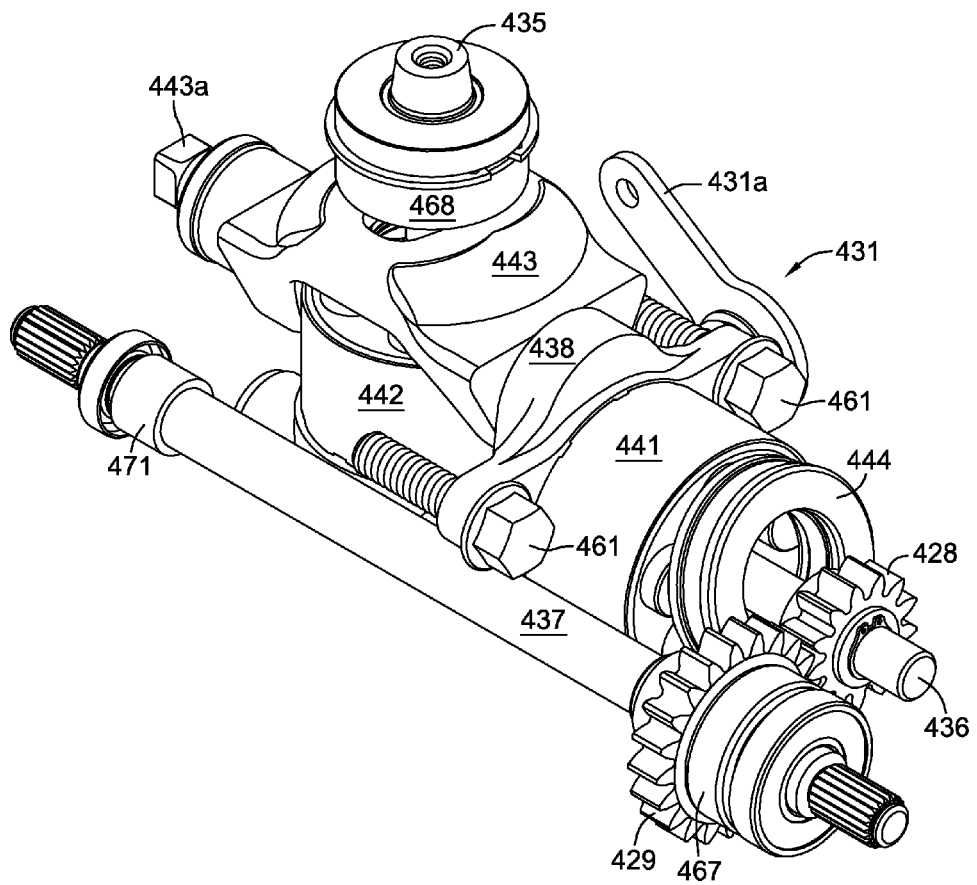
FIG. 20 is a perspective view of the internal components of the fourth embodiment.
Figure 21:
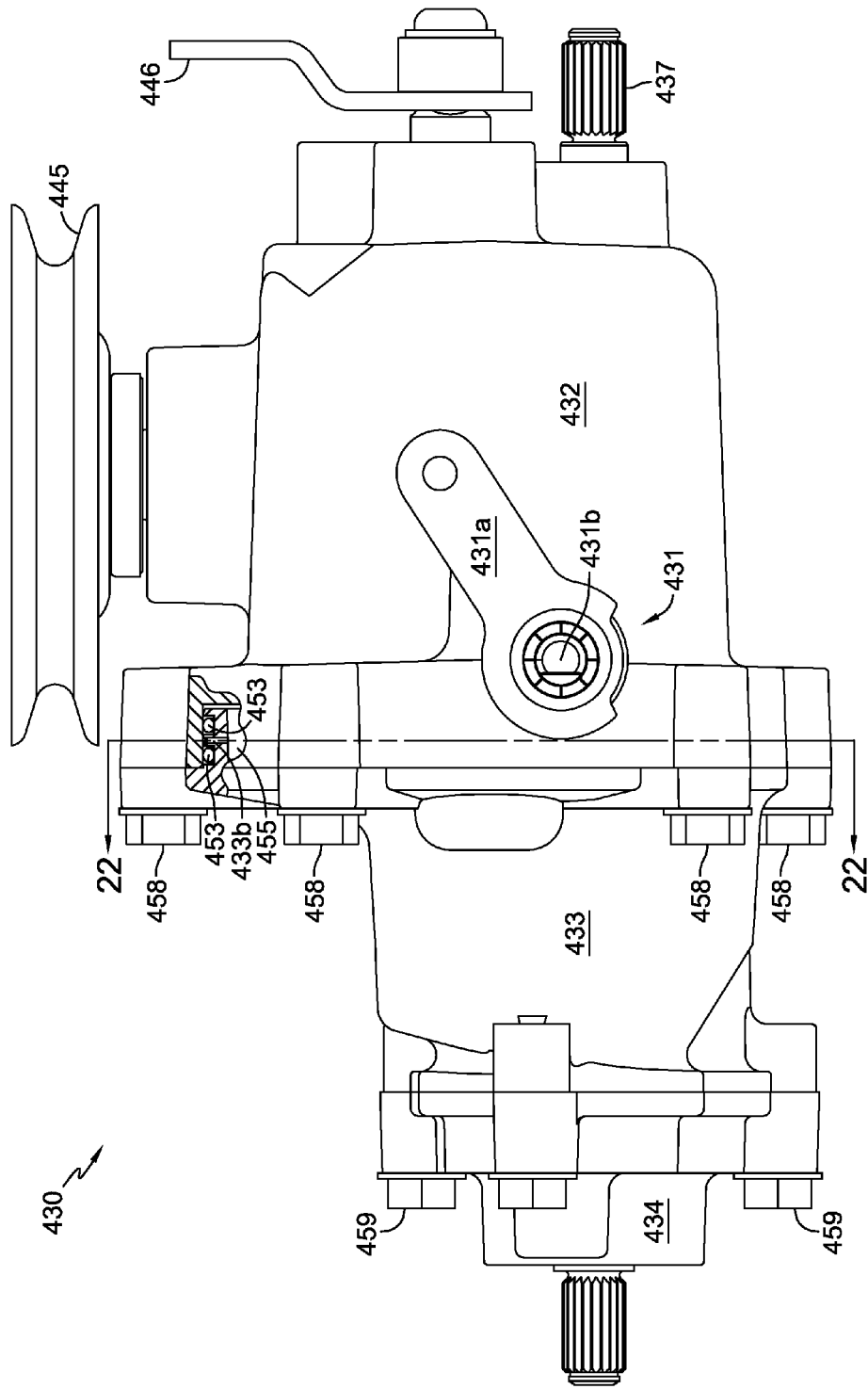
FIG. 21 is a side view of the fourth embodiment.

A third embodiment of a transmission 330 is shown in FIG. 18. Similar to transmission 30, variable speed transmission 330 is driven by input pulley 345, with output speed and direction controlled by movement of control arm 346. However, in this embodiment, additional transmission control capabilities known in the art are provided. For example, actuation of a block-lift bypass mechanism (not shown) via rotation of bypass arm 331 lifts the motor cylinder block off of its running surface on the center section to effectively open the hydraulic fluid circuit in order to allow an operator to manually move the vehicle or driven equipment without the resistance associated with hydraulically driving the transmission. The workings of a block-lift bypass mechanism are described in detail in commonly owned U.S. Pat. No. 5,201,692, which is incorporated by reference herein and shall not be further described. Additionally, return-to-neutral (RTN) assembly 340 is provided to force control arm 346 to a neutral, zero or near-zero output position when an overriding force is not being applied to move control arm 346 away from the neutral position. The workings of a scissor-arm RTN assembly similar to RTN assembly 340 are described in detail in commonly owned U.S. Pat. No. 6,487,857, which is incorporated by reference herein and shall not be further described.

A fourth embodiment of a variable speed transmission 430 is shown in FIGS. 19-25. Similar to transmission 30 in its basic function, but having a single stage reduction and a transmission output through-shaft 437, variable speed transmission 430 is driven by input pulley 445 attached to pump input shaft 435. The pump input shaft 435 is supported at one end by a pump shaft support (not shown) formed in the center section 438 and by a bearing 468 proximate to its opposite end, the bearing supported by pump housing 432. The speed and direction of motor output shaft 436 is controlled by the position of control arm 446, which is attached to the integral trunnion shaft 443a of swash plate 443. The swash plate 443 is supported along its integral trunnion shaft 443a by housing 432 while an integral trunnion protrusion opposite trunnion shaft 443a(not shown, but substantially similar to trunnion protrusion 43a of swash plate 43) is supported by a cylindrical support 438a formed in center section 438. Pump cylinder block 442 and motor cylinder block 441 of transmission 430 are disposed on corresponding running surfaces of center section 438 and have the same associated pistons, springs and thrust bearings, and operate in the same manner, as the cylinder blocks of transmission 30. In transmission 430, the rotational axes of swash plate 443, pump input shaft 435 and motor output shaft 436 are arranged in the same geometric and spatial relationships as these same or similar components (swash plate 43, pump input shaft 35 and motor output shaft 36) in transmission 30, although motor output shaft 436 is supported differently at the end distant from center section 438 than is motor output shaft 36. That is, motor output shaft 436 is supported at one end by a motor shaft support (not shown) formed in center section 438 and at its opposite end by shaft support structure 434a formed in reduction gear set housing 434. A journal bearing or other type of bearing or wear-resistant feature (not shown) may be added to the shaft support structure 434a to improve the service life of transmission 430, if needed.

In this fourth embodiment, motor output shaft 436 drives pinion gear 428 which drives a reduction gear 429 that is splined or otherwise rotatably fixed to an output through-shaft 437 positioned parallel to motor output shaft 436. Transmission 430 has a three-piece sealed housing comprising pump housing 432, motor housing 433 and reduction gear set housing 434. Housing 433 is joined to housing 432 via fasteners 458 along a first vertical split line located on a first plane perpendicular to motor output shaft 436 and output through-shaft 437. Housing 434 is joined to housing 433 via fasteners 459 along a second vertical split line located on a second plane perpendicular to motor output shaft 436 and output through-shaft 437. Output through-shaft 437 is supported proximate to one end by bearing 471 disposed in pump housing 432 and proximate to its other end by bearing 467 disposed in reduction gear set housing 434. Spacer 465 provides a running surface for gear 429 as well as properly positioning the gear 429. It should be understood that the present invention contemplates an alternate embodiment of a transmission (not shown) similar to transmission 430 in which the output shaft extends from the housing at only one end, adjacent the single stage reduction, while the other end of the output shaft remains internal to the pump housing, being rotationally supported therein. Pump housing 432 could be utilized by this alternate embodiment, wherein the opening normally machined for through-shaft 437 is not machined, but rather is replaced by a pocket supporting a bearing similar to bearing 471.

As in transmission 330, transmission 430 also includes a block-lift bypass assembly 431 comprising block-lift bypass arm 431a attached to block-lift bypass cam shaft 431b, which in turn engages block-lift bypass pin 431c. Cam shaft 431b includes a flat surface formed thereon, such that when cam shaft 431b is rotated, block-lift bypass pin 431c is pushed against motor cylinder block 441, overcoming the force of the piston springs (not shown) that push pistons 441a firmly against thrust bearing 444, and thereby lifting motor cylinder block 441 from the motor running surface of center section 438 to effectively open the hydraulic circuit.

Figure 22:
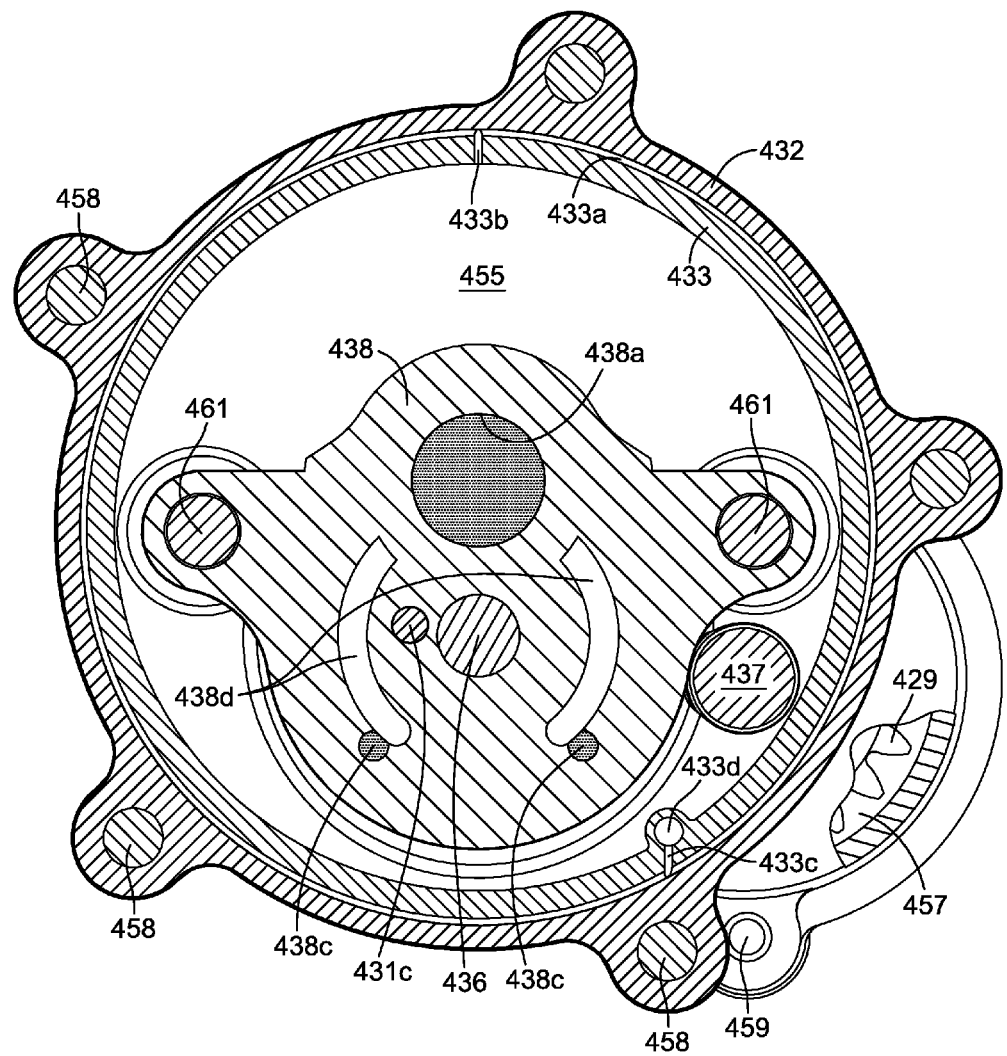
FIG. 22 is a cross-sectional view of the fourth embodiment along line 22-22 of FIG. 21.
Figure 23:
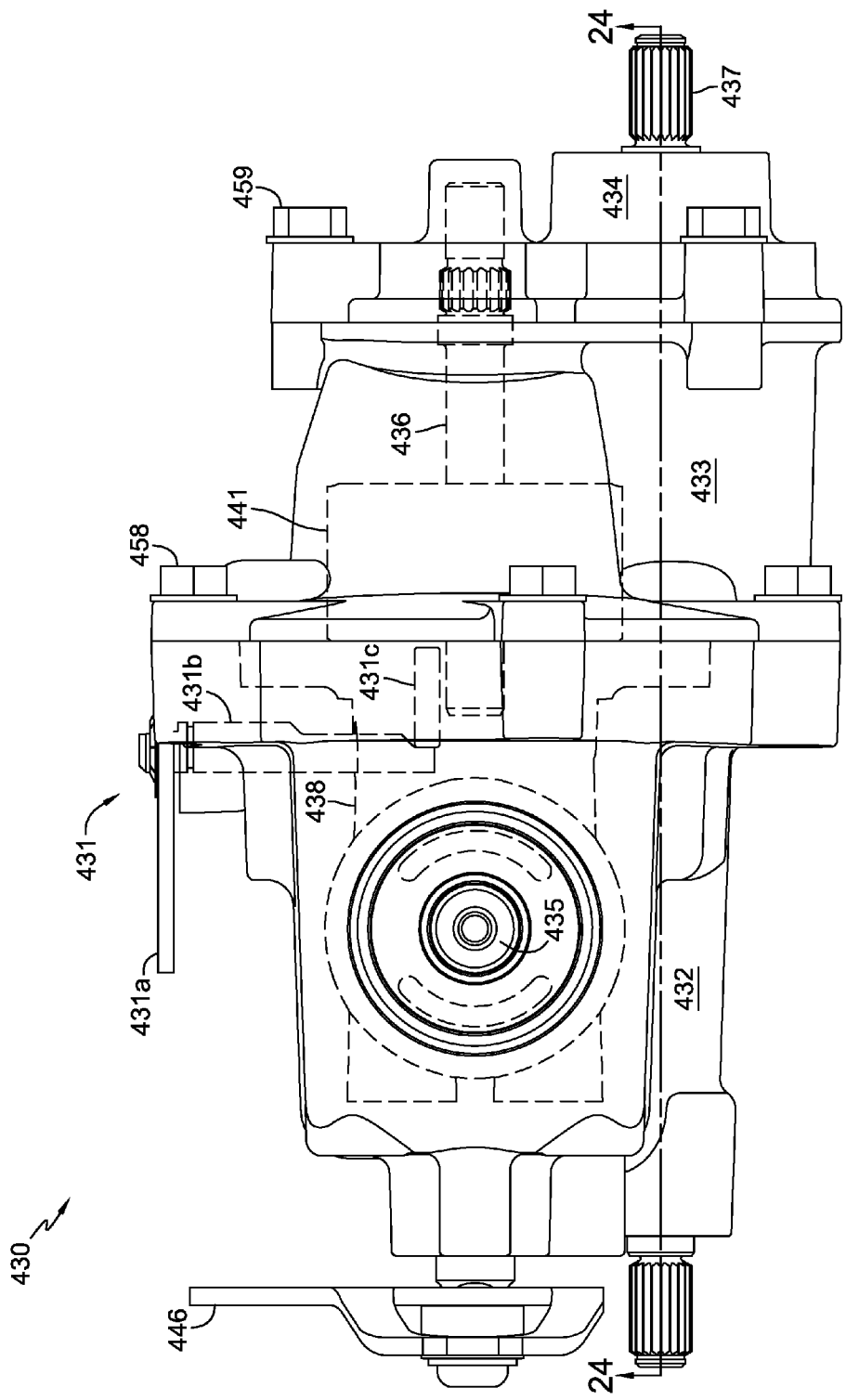
FIG. 23 is a top plan view of the fourth embodiment with certain internal components depicted with dashed lines.

In the same manner as center section 38 of transmission 30, center section 438 is attached to pump housing 432 using only two screws 461. Center section 438 is also very similar in form to center section 38 except that it includes additional structure comprising an opening 438b for block-lift bypass cam shaft 431b and a smaller opening perpendicular to opening 438b to slidingly accommodate pin 431c, shown in cross-section in FIG. 22 and as dashed lines in FIG. 23. Otherwise, center section 438 includes the same kidney ports, fluid passages, mounting features and check plug ports as found in center section 38 of transmission 30. In FIG. 22, for example, which depicts a vertical cross-section taken through center section 438 at the centerline of siphon fluid passage 433a proximate to the running surface of motor cylinder block 441, the ends of the check fluid passages 438c that are connected to kidney ports 438d and are in fluid communication with check plugs 463 can be seen. Additionally, in FIG. 25, mounting fastener openings 438e, one of a plurality of motor pistons 441a, pump pistons 442a and check plugs 463 can be seen.

Referring again to FIG. 22, the aforementioned siphon fluid passage 433a is an annular groove formed in housing 433. The fluid passage 433a is isolated by two o-rings 453, one positioned on each side of the groove. The joint between housings 432 and 433 is also sealed by these same two o-rings 453. Other suitable known sealing means could be substituted for o-rings 453. Siphon fluid passage 433a is connected to main sump 455 via fluid passage 433b and to expansion sump 457 via fluid passages 433c and 433d. Passages 433b and 433c are oriented vertically while passage 433d is oriented horizontally and connects passage 433c to expansion sump 457. Main sump 455 is located in the volume created by joining pump housing 432 and motor housing 433 together, while expansion sump 457 is located in the volume created when reduction gear set housing 434 is joined to motor housing 433. Sumps 455 and 457 are sealed apart from one another except for the aforementioned fluid passages allowing transmission fluid to flow between them. That is, as transmission 430 is operated, heat is generated and the transmission fluid in main sump 455 expands, flowing through passage 433b to passage 433a, continuing on to passage 433c and finally through passage 433d to expansion sump 457. As the transmission fluid in sump 455 cools, the flow reverses and fluid is siphoned from expansion sump 457 to sump 455. Main sump 455 is filled at assembly and remains full of transmission fluid while expansion sump 457 is partially filled at assembly and the fluid level fluctuates. This fluctuation stays within a volume range sufficient to provide adequate lubrication for gears and seals located in or exposed to the fluid in expansion sump 457, but insufficient to completely fill expansion sump 457 under the normal expected range of operating conditions and temperatures of transmission 430.

Figure 26:
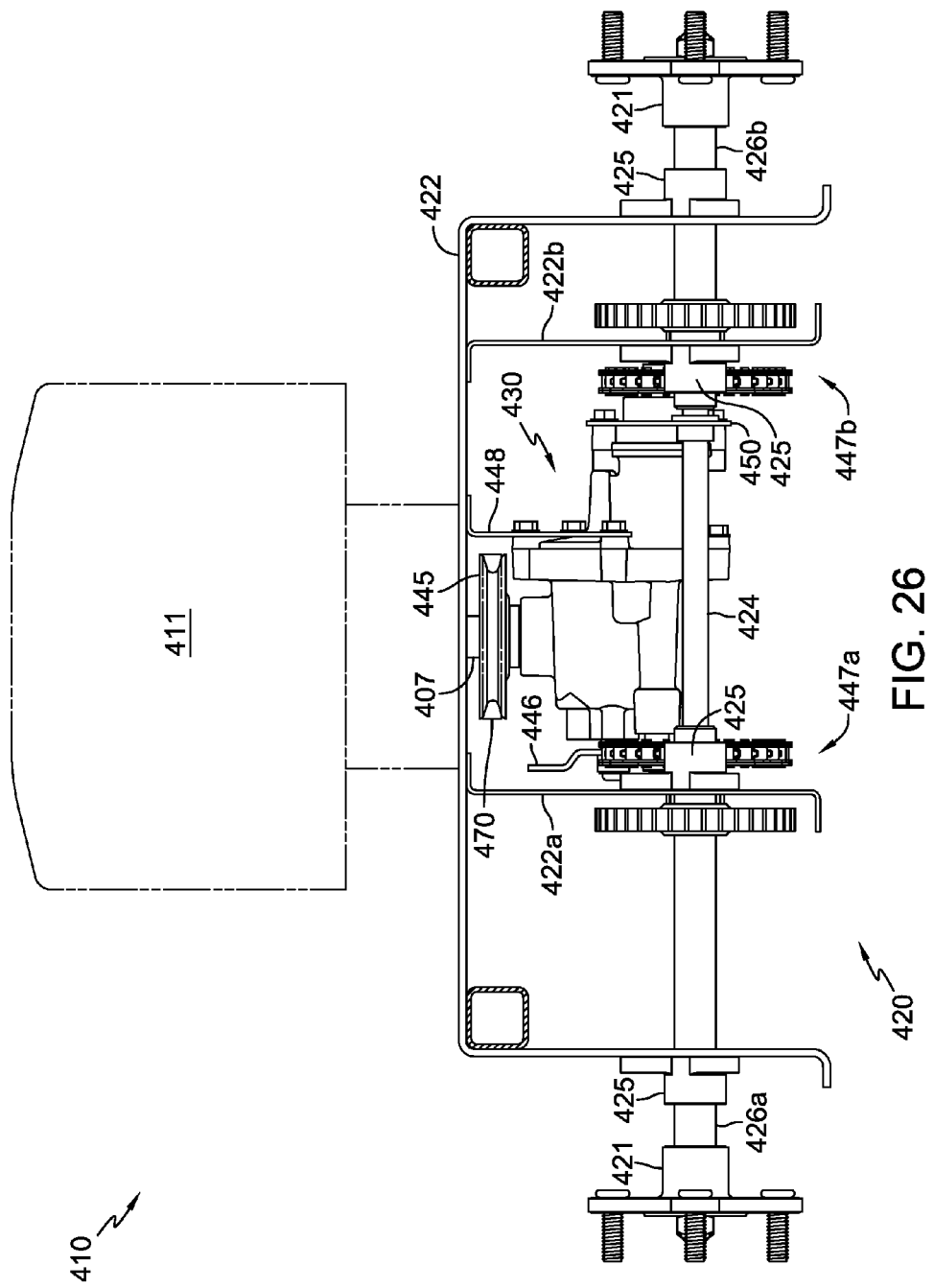
FIG. 26 is an elevational view of a fourth configuration of a drive assembly incorporating the fourth embodiment of the transmission, with each end of the output through-shaft driving an external two-stage reduction gear set.

Referring now to FIG. 26, a fourth configuration of a drive assembly 420 is illustrated as a portion of a vehicle 410 incorporating transmission 430 with each end of the output through-shaft 437 driving an external two-stage reduction gear train. Output shaft 407 of prime mover 411 extends through frame 422 and has an attached pulley (not shown) driving belt 470 to power input pulley 445 of transmission 430. In an alternate configuration (not shown), prime mover 411 may be positioned such that output shaft 407 extends through frame 422 to drive transmission 430 directly via an adapter coupling connecting output shaft 407 to input shaft 435, thereby eliminating belt 470 and the associated pulleys in order to reduce material and maintenance costs. The output speed and direction of transmission 430 may be controlled via mechanical linkage (not shown) connected between operator controls (not shown) and control arm 446. Optionally, an electrical linear or rotary actuator (not shown) may be employed in lieu of a mechanical linkage to operate (or replace in the case of a rotary actuator) control arm 446. Transmission 430 drives a pair of two-stage reduction gear trains 447a and 447b, each of which is the same as or similar to gear train 47 of drive assembly 20. Gear trains 447a and 447b drive axles 426a and 426b, respectively, with each axle supported by a pair of bearings 425 attached to frame 422 and each axle driving a wheel or wheel hub 421. Vertical brackets 422a and 422b of frame 422 are provided to support each of the two inboard axle bearings 425. Upper bracket 448 attached to frame 422 is provided to rigidly support transmission 430. Support shaft 424 provides support structure for elements of gear trains 447a and 447b as well as for lower bracket 450. Lower bracket 450 is attached to transmission 430 and engaged to support shaft 424 to provide further stability to the mounting configuration of transmission 430 in an arrangement similar to that of the second configuration of a drive assembly 120. Additional frame structure or gear train guard elements (not shown) can be added to strengthen frame 422 and partially or completely enclose gear trains 447a and 447b to preclude contamination and prevent any undesired contact with the gear trains.

Figure 27:
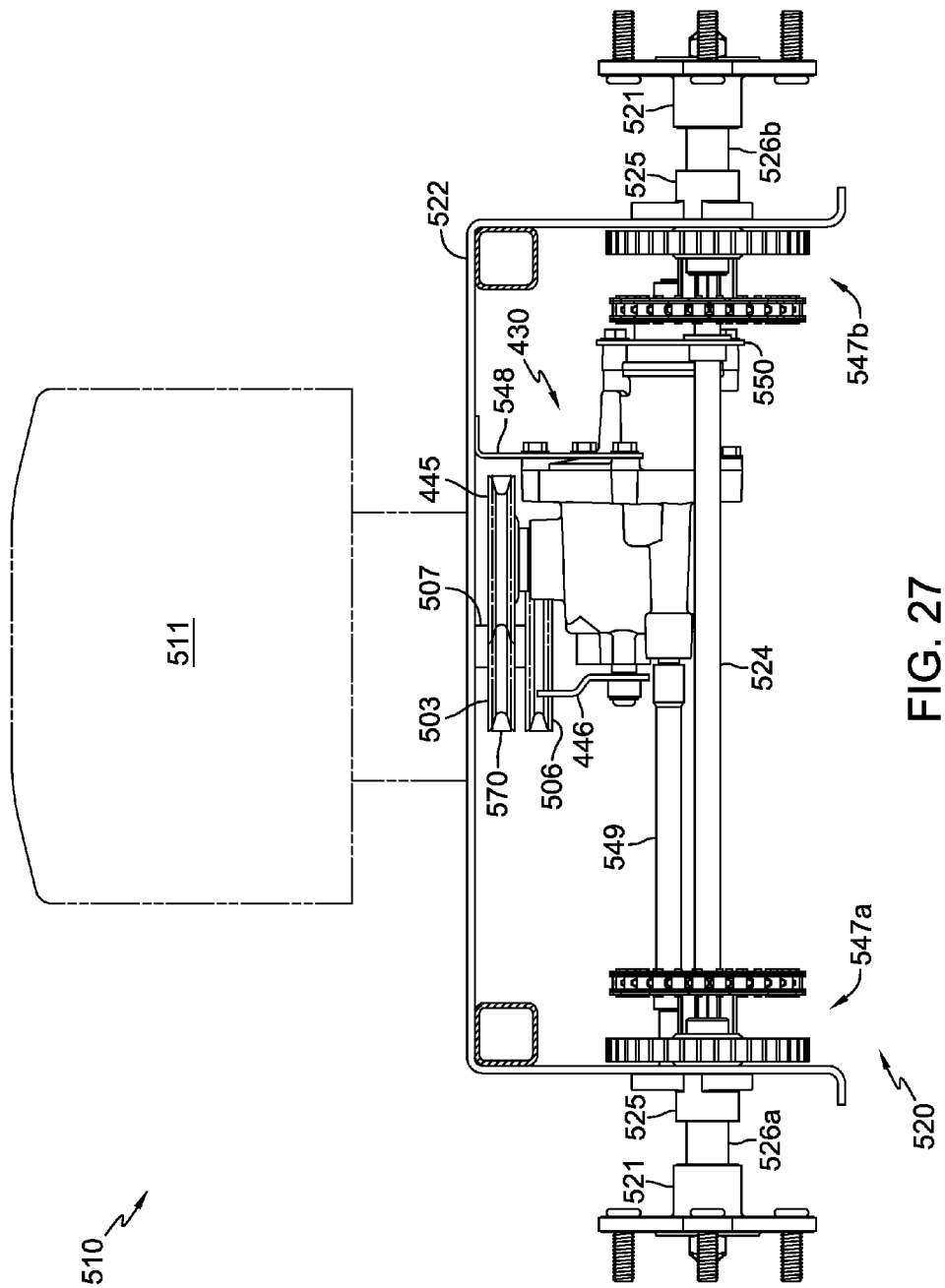
FIG. 27 is an elevational view of a fifth configuration of a drive assembly incorporating the fourth embodiment of the transmission, with an output through-shaft extension enabling outward placement of the external two-stage reduction gear sets shown in FIG. 26.

Referring now to FIG. 27, a fifth configuration of a drive assembly 520 is illustrated as a portion of a vehicle 510 incorporating transmission 430 with one end of output through-shaft 437 directly driving a two-stage reduction gear train 547b and with the other end of output through-shaft 437 indirectly driving a two-stage reduction gear train 547a via an output shaft extension 549. Output shaft extension 549 enables outward placement of the external two-stage reduction gear trains 547a and 547b. Output shaft 507 of prime mover 511 extends through frame 522 and has an attached pulley 503 driving belt 570 to power input pulley 445 of transmission 430. The output speed and direction of transmission 430 may be controlled via mechanical linkage (not shown) connected between operator controls (not shown) and control arm 446. Optionally, an electrical linear or rotary actuator (not shown) may be employed in lieu of a mechanical linkage to operate (or replace in the case of a rotary actuator) control arm 446. As illustrated, a pulley 506 may also be driven by output shaft 507 to power a mowing deck (not shown) or other equipment (not shown) of vehicle 510. Gear trains 547a and 547b drive axles 526a and 526b, respectively, with each axle supported by one or more bearings 525 (FIG. 27 depicts one bearing per axle) attached to frame 522, and each axle driving a wheel or wheel hub 521. Upper bracket 548 attached to frame 522 is provided to support transmission 430. Support shaft 524 provides support for elements of gear trains 547a and 547b as well as for lower bracket 550. Lower bracket 550 is attached to transmission 430 and engaged to support shaft 524 to provide further stability to the mounting configuration of transmission 430 in an arrangement similar to that of drive assembly 120 and drive assembly 420. Additional frame structure or gear train guard elements (not shown) can be added to strengthen frame 522, and partially or completely enclose gear trains 547a and 547b to preclude contamination and prevent any undesired contact with the gear trains.

Figure 28:
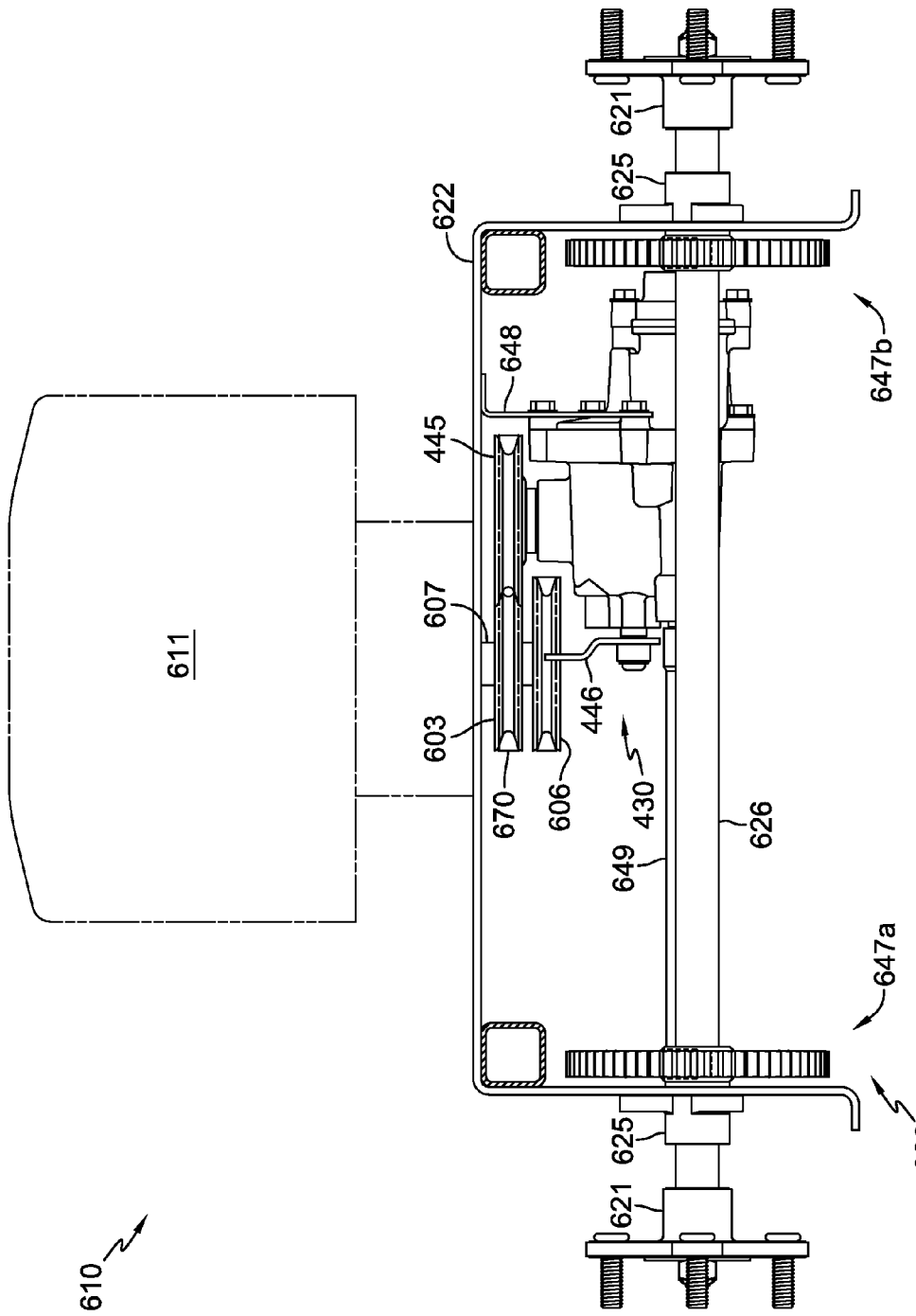
FIG. 28 is an elevational view of a sixth configuration of a drive assembly incorporating the fourth embodiment of the transmission, with an output through-shaft extension, a single axle, and external single-stage reduction gear sets.

Referring now to FIG. 28, a sixth configuration of a drive assembly is illustrated as a portion of a vehicle 610 incorporating transmission 430 with one end of output through-shaft 437 directly driving a single-stage reduction gear arrangement 647b, and the other end of output through-shaft 437 indirectly driving a single-stage reduction gear arrangement 647a via output shaft extension 649. Output shaft extension 649 enables outward placement of the external single-stage reduction gear arrangements, 647a and 647b respectively. Output shaft 607 of prime mover 611 extends through frame 622 and has an attached pulley 603 driving belt 670 to power input pulley 445 of transmission 430. The output speed and direction of transmission 430 may be controlled via mechanical linkage (not shown) connected between operator controls (not shown) and control arm 446. Optionally, an electrical linear or rotary actuator (not shown) may be employed in lieu of a mechanical linkage to operate (or replace in the case of a rotary actuator) control arm 446. As illustrated, a pulley 606 may also be driven by output shaft 607 to power auxiliary equipment (not shown) of vehicle 610. Gear trains 647a and 647b drive a single axle 626 supported by bearings 625 attached to frame 622, axle 626 driving wheel hubs 621. Bracket 648 attached to frame 622 is provided for rigid support of transmission 430.

Figure 29:
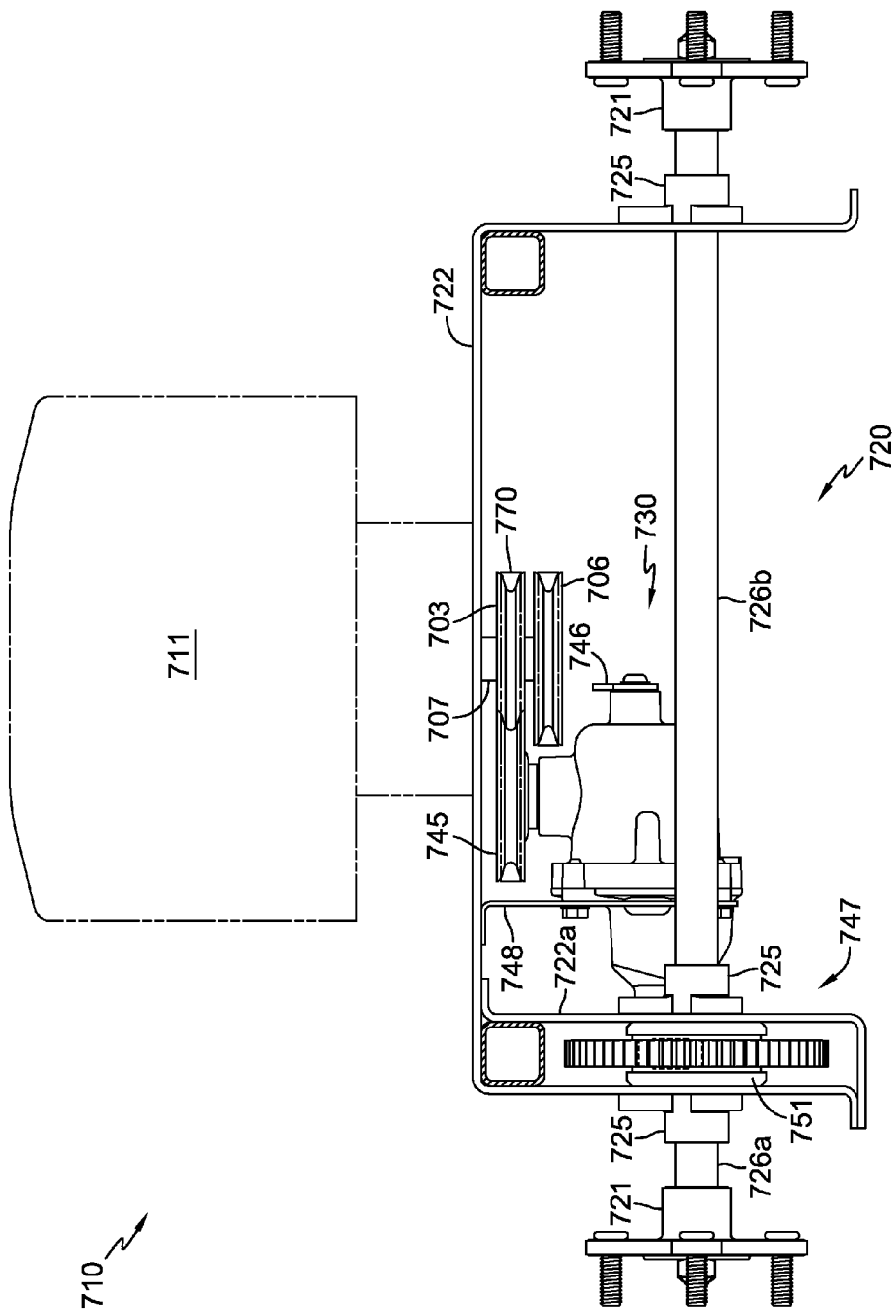
FIG. 29 is an elevational view of a seventh configuration of a drive assembly incorporating the first embodiment of the transmission with an external single-stage gear reduction and a differential.

Referring now to FIG. 29, a seventh configuration of a drive assembly 720 is illustrated as a portion of a vehicle 710 incorporating a single fixed-mounted transmission 730, which may be the same as or substantially similar to transmission 30. Output shaft 707 of prime mover 711 extends through frame 722 to drive the input pulley 745 of transmission 730 via pulley 703 and belt 770. The output speed and direction of transmission 730 is controlled via mechanical linkage (not shown) connected between an operator control (not shown) and control arm 746. Optionally, an electrical linear or rotary actuator (not shown) may be employed in lieu of mechanical linkage to operate (or replace in the case of a rotary actuator) control arm 746. As illustrated, a pulley 706 may also be driven by output shaft 707 to power a mowing deck (not shown) or other equipment (not shown) of vehicle 710. Transmission 730 drives a single-stage reduction gear arrangement 747 that cooperates with a differential 751, such as the depicted, commercially-available Auto-Lok® differential manufactured by the Hilliard Corporation of Elmira, N.Y., to provide improved traction and turning characteristics to vehicle 710. Gear train 747 with differential 751 drives axles 726a and 726b, respectively, with each axle supported by a bearing 725 attached to frame 722 or attached to vertical bracket 722a of frame 722, each axle driving a wheel hub 721. As shown, vertical bracket 722a may be formed and joined to other frame 722 structure in order to create a rectangular tube-like configuration to increase frame strength and protect the gear train 747 and differential 751. Additional frame or gear train guard elements (not shown) can be added to partially or completely enclose the gear train 747 and differential 751 to preclude contamination and prevent any undesired contact with these components. As shown, bracket 748 is attached to frame 722 (or optionally, to bracket 722a) to provide rigid support for mounting transmission 730.

Figure 30:
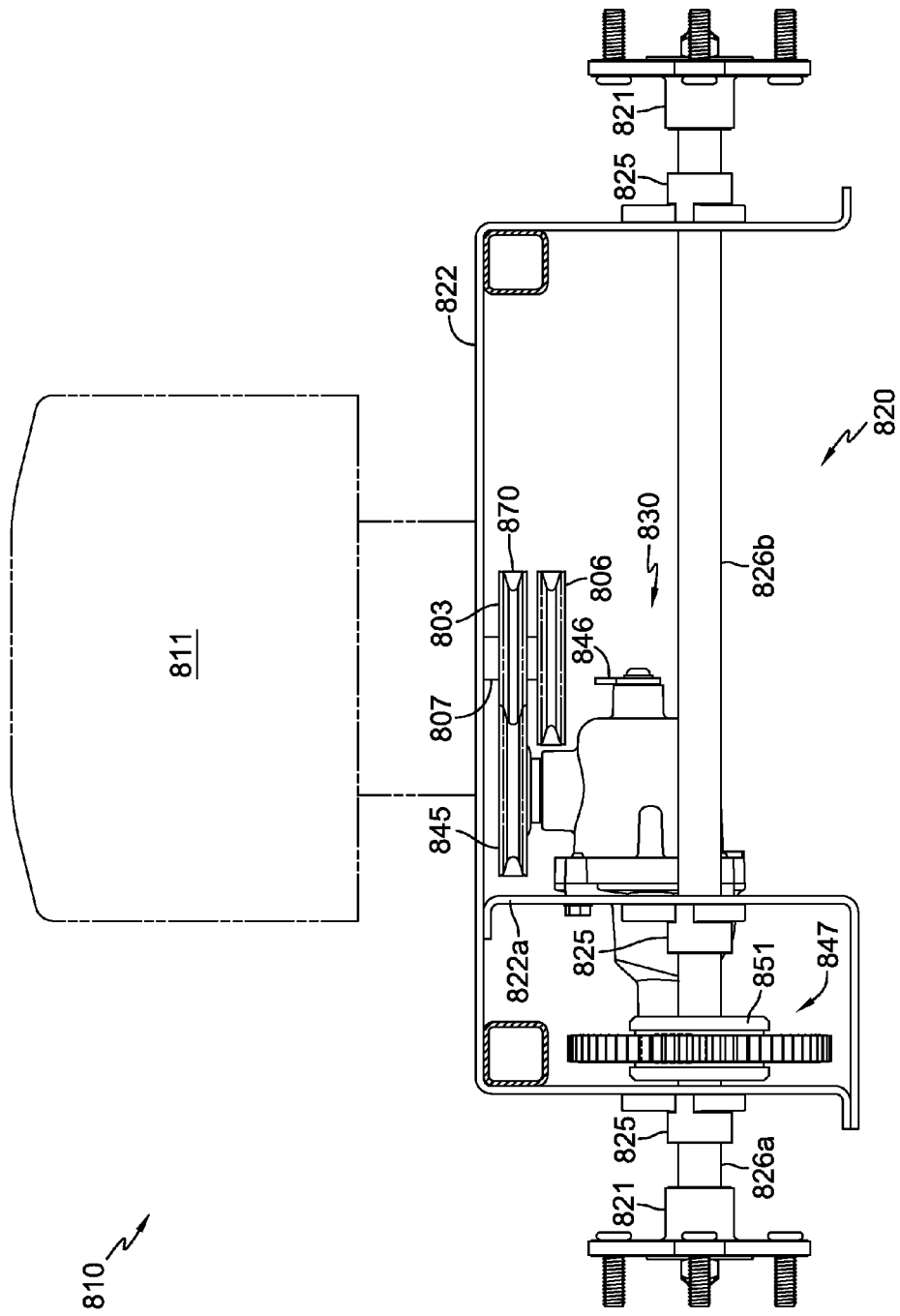
FIG. 30 is an elevational view of an eighth configuration of a drive assembly similar to that of FIG. 29, with a modified axle support scheme.

Referring now to FIG. 30, an eighth configuration of a drive assembly 820 is illustrated. This configuration varies from that of the seventh configuration of a drive assembly 720 only in the manner in which the single fixed-mounted transaxle 830 and the bearing 825 supporting drive axle 826b nearest its proximal end are supported by vehicle frame 822. Here, a single bracket 822a forms a rectangular tube-like structure with frame 822 to rigidly support both transmission 830 and bearing 825. This eliminates the need for a separate mounting bracket for each element. The structure and function of all sequentially-labeled elements is as described for the corresponding elements of drive assembly 720, and shall not be further described herein.

Figure 31:
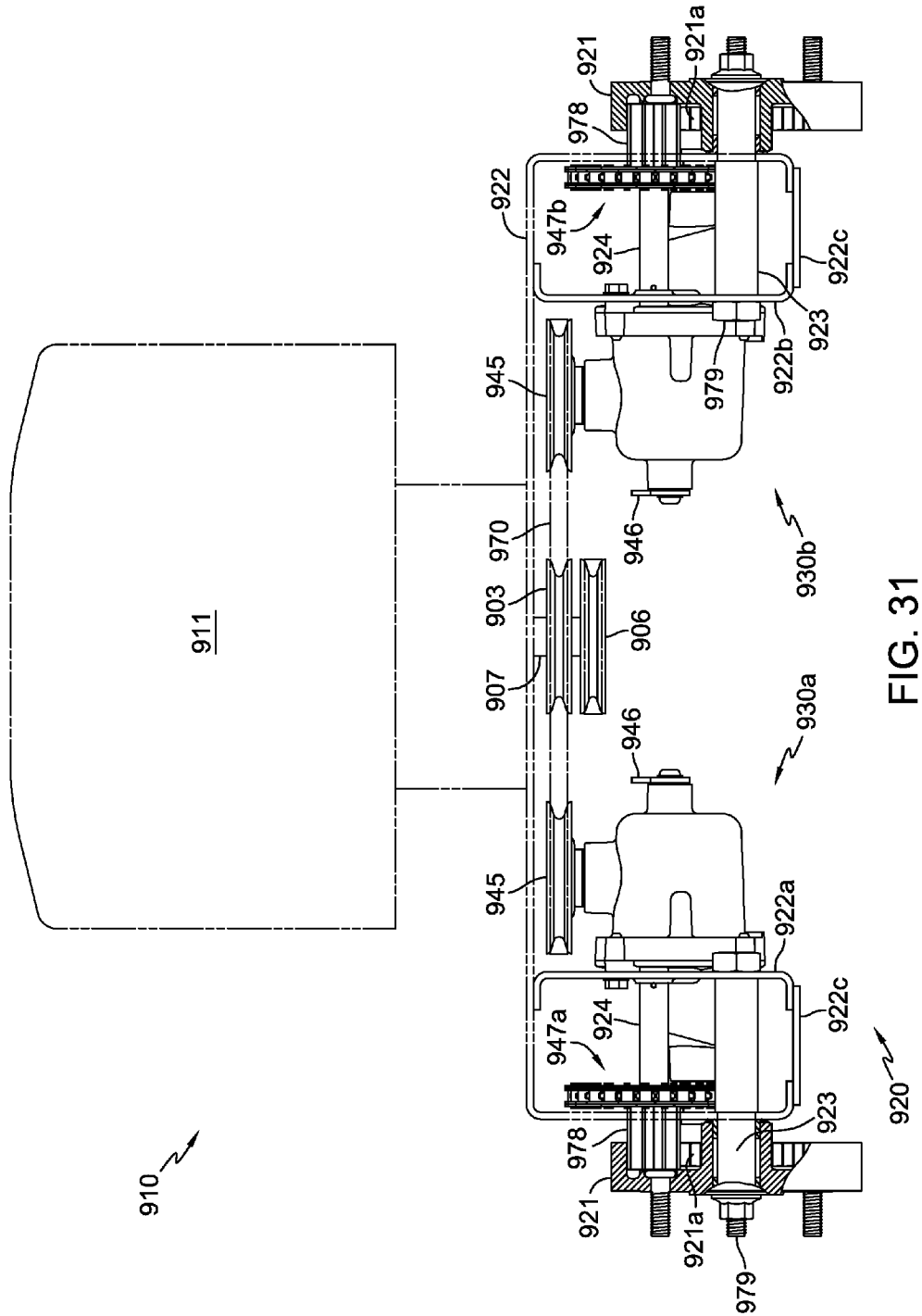
FIG. 31 is an elevational view of a ninth configuration of a drive assembly illustrated as a portion of a zero turn radius vehicle incorporating two first embodiment transmissions, each transmission driving an external two-stage gear reduction having a ring gear formed on the driven wheel hub.

Referring now to FIG. 31, a ninth configuration of a drive assembly 920 is illustrated as a portion of a zero turn radius vehicle 910 incorporating two fixed-mounted transmissions, 930a and 930b respectively, each of which may be the same as or substantially similar to transmission 30. Output shaft 907 of prime mover 911 extends through frame 922 to drive the input pulleys 945 of transmissions 930a and 930b respectively via pulley 903 and belt 970. The output speed and direction of each transmission, 930a and 930b respectively, is individually controlled via mechanical linkages (not shown) connected between separate operator controls (not shown) and control arms 946 to enable zero turn radius capability. Optionally, separate electrical linear or rotary actuators (not shown) may be employed in lieu of mechanical linkages to individually operate (or replace in the case of rotary actuators) control arms 946. As illustrated, a pulley 906 may also be driven by output shaft 907 to power a mowing deck (not shown) or other equipment (not shown) of vehicle 910. Transmissions 930a and 930b each drive two-stage reduction gear trains 947a and 947b, respectively, with the second-stage reduction of each gear train comprising a ring gear 921a integrally formed on (or attached to) wheel hub 921. The combination chain sprocket/spur gear 978 that comprises an intermediate component of each of the two-stage reduction gear trains 947a and 947b, respectively, is supported by a support shaft 924. Wheel hubs 921 are rotatably supported on hub support tubes 923 attached to frame 922 and further supported and retained by bolts 979. Vertical brackets 922a and 922b of frame 922 are provided to rigidly mount transmissions 930a and 930b, respectively, and also to provide support for the inboard end of each hub support tube 923 and bolt 979. As shown, bottom plates 922c may be added to create box beams or rectangular box-like structures in conjunction with other frame elements in order to increase frame strength and protect certain elements of the gear trains, such as the illustrated sprockets and chains of the first-stage gear reductions, for example. Additional frame or gear train guard elements (not shown) can be added to enclose certain elements of the gear train, as needed, thereby reducing the likelihood of undesired contact with or contamination of certain elements of the gear train.

Figure 32:
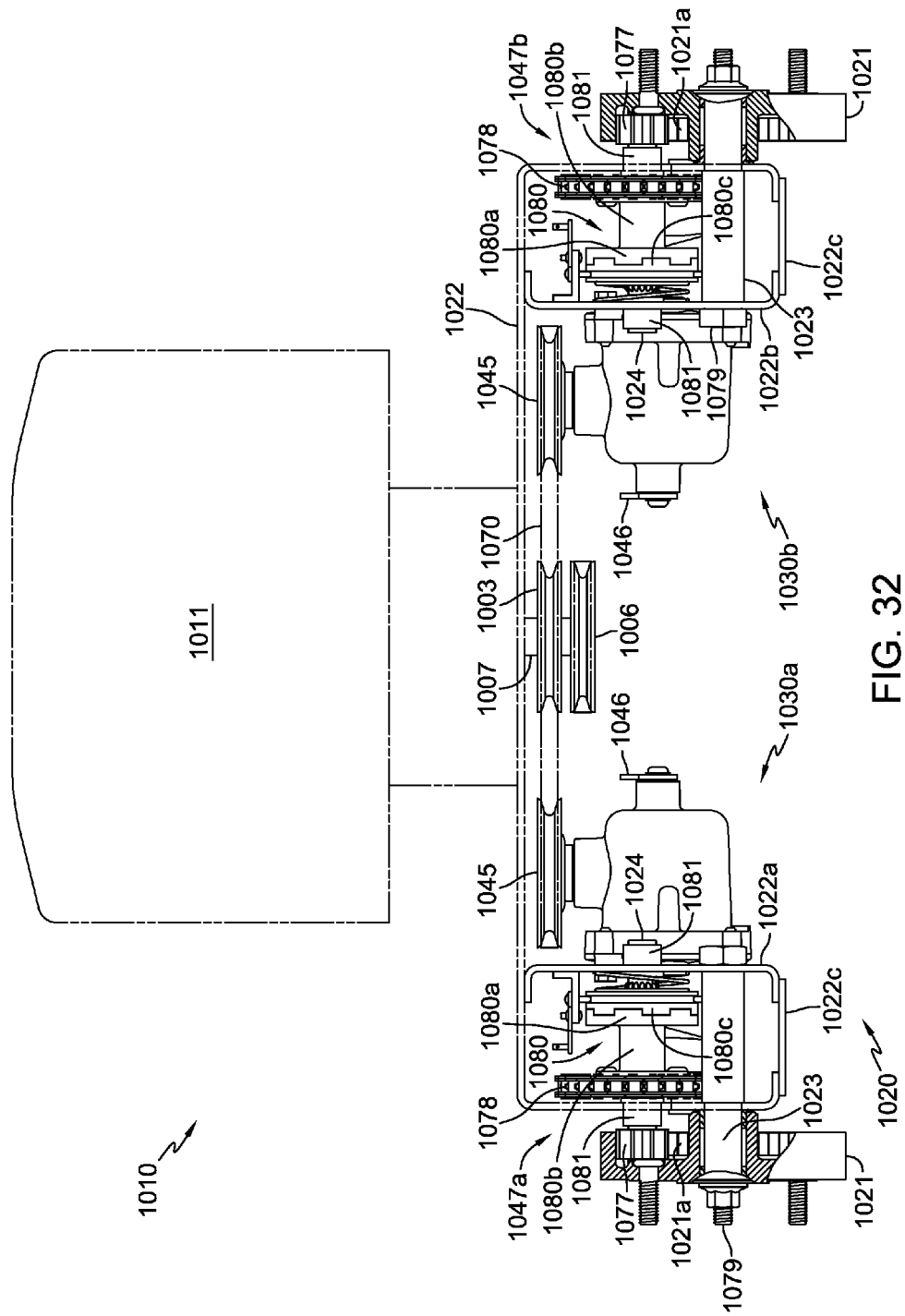
FIG. 32 is an elevational view of a tenth configuration of a drive assembly similar to that of FIG. 31, having a clutch mounted on a support shaft of each two-stage gear reduction.

Referring now to FIG. 32, a tenth configuration of a drive assembly 1020 is illustrated as a portion of a zero turn radius vehicle 1010 incorporating two fixed-mounted transmissions 1030a and 1030b, respectively, each of which may be the same as or substantially similar to transmission 30. Output shaft 1007 of prime mover 1011 extends through frame 1022 to drive the input pulleys 1045 of transmissions 1030a and 1030b, respectively, via pulley 1003 and belt 1070. The output speed and direction of each transmission 1030a and 1030b, respectively, is individually controlled via mechanical linkages (not shown) connected between separate operator controls (not shown) and control arms 1046 to enable zero turn radius capability. Optionally, separate electrical linear or rotary actuators (not shown) may be employed in lieu of mechanical linkages to individually operate (or replace in the case of rotary actuators) control arms 1046. As illustrated, a pulley 1006 may also be driven by output shaft 1007 to power a mowing deck (not shown) or other equipment (not shown) of vehicle 1010. Transmissions 1030a and 1030b each drive two-stage reduction gear trains 1047a and 1047b, respectively, with the second-stage reduction of each gear train comprising a ring gear 1021a integrally formed on (or attached to) a wheel hub 1021 and a pinion gear 1077 that is rotatably fixed to a support shaft 1024. Each support shaft 1024 is supported by bearings or bushings 1081 so that, when a clutch 1080 is engaged, and control arm 1046 is rotated out of a neutral position, support shaft 1024 is driven to rotate pinion gear 1077, driving wheel hub 1021 via ring gear 1021a. Clutches 1080 are not steering clutches in this configuration, but rather may be employed in lieu of hydraulic bypass assemblies such as block-lift bypass assembly 431 described herein previously, in order to preclude any hydraulic circuit resistance imparted by transmissions 1030a and 1030b, respectively, allowing relatively easy manual movement of a temporarily unpowered vehicle 1010. Vehicle 1010 is steered by the relative outputs of transmissions 1030a and 1030b, respectively.

As shown, certain components of gear trains 1047a and 1047b, respectively, as well as clutch assemblies 1080, are supported on support shafts 1024. For example, the outboard engagement member 1080a of each clutch 1080 includes a tubular portion 1080b attached to a chain-driven sprocket 1078, or alternatively, to a first-stage reduction gear (not shown). Under power from the corresponding transmission, 1030a or 1030b, tubular portion 1080b rotates with chain-driven sprocket 1078; either rotating freely about support shaft 1024 when the inboard engagement member 1080c is disengaged from outboard engagement member 1080a, or rotating synchronously with support shaft 1024 and pinion gear 1077 when the inboard engagement member 1080c is engaged to outboard engagement member 1080a. Inboard engagement member 1080c functions by sliding axially along support shaft 1024, while being rotationally fixed thereto. The clutch assemblies 1080 are biased toward engagement.

Wheel hubs 1021 are rotatably supported on hub support tubes 1023 attached to frame 1022 and further supported and retained by bolts 1079. Vertical brackets 1022a and 1022b of frame 1022 are provided to rigidly mount transmissions 1030a and 1030b, respectively, and also to provide support for the inboard end of each hub support tube 1023 and bolt 1079. As shown, bottom plates 1022c may be added to create box beams or rectangular box-like structures in conjunction with other frame elements in order to increase frame strength and protect certain elements of the gear trains, such as sprockets 1078, clutch assemblies 1080, etc. Additional frame or gear train guard elements (not shown) can be added to enclose certain elements of the gear train, as needed, thereby reducing the likelihood of undesired contact with or contamination of certain elements of the gear train.

Figure 33:
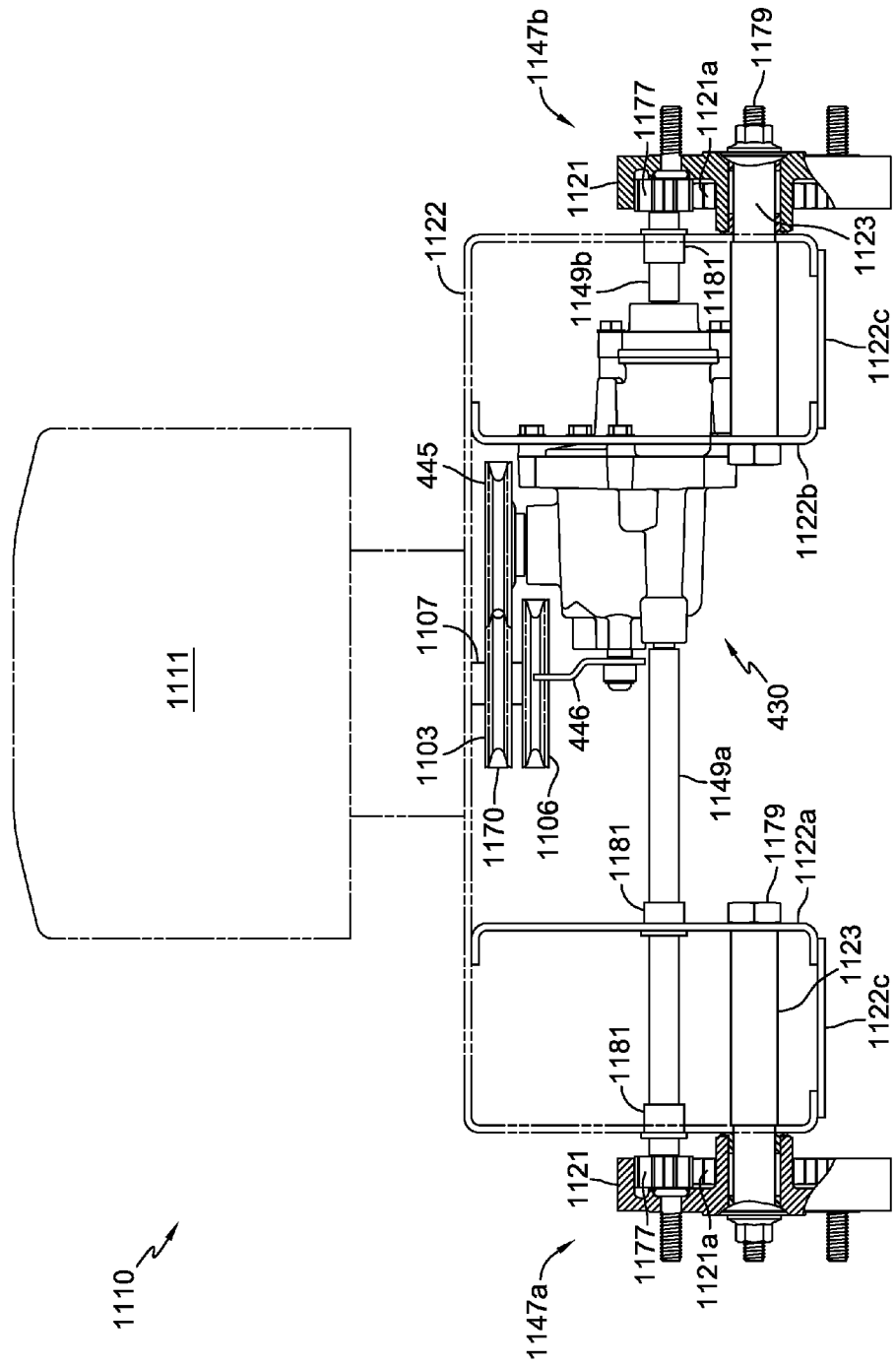
FIG. 33 is an elevational view of an eleventh configuration of a drive assembly incorporating the fourth embodiment of the transmission, an output through-shaft extension, and a pair of external single-stage gear reductions, each having a ring gear formed on the driven wheel hub.

In FIG. 33, an eleventh configuration of a drive assembly 1120 is illustrated as a portion of a vehicle 1110 incorporating transmission 430 with one end of output through-shaft 437 driving a single-stage reduction gear arrangement 1147a via output shaft extension 1149a, and with the other end of through-shaft 437 driving a single-stage reduction gear arrangement 1147b via output shaft extension 1149b. Each of the gear arrangements 1147a and 1147b comprise a ring gear 1121a integrally formed on (or attached to) a wheel hub 1121 and a pinion gear 1177 rotatably fixed to each of the shaft extensions, 1149a and 1149b respectively. Each of the shaft extensions 1149a and 1149b is supported by one or more bearings or bushings 1181 as both shaft extensions are rotationally driven by output through-shaft 437 of transmission 430. Wheel hubs 1121 are rotatably supported on hub support tubes 1123 attached to frame 1122 and further supported and retained by bolts 1179. Vertical brackets 1122a and 1122b of frame 1122 are provided to rigidly mount transmission 430 and also to provide support for the inboard end of each hub support tube 1123 and bolt 1179. As shown, bottom plates 1122c may be added to create box beams or rectangular box-like structures in conjunction with other frame elements to increase frame strength and protect certain portions of the drive assembly. Additional frame or gear train guard elements (not shown) can be added to enclose certain portions of the drive assembly, as needed, thereby reducing the likelihood of undesired contact with or contamination of those portions of the drive assembly.

Output shaft 1107 of prime mover 1111 extends through frame 1122 and has an attached pulley 1103 driving belt 1170 to power input pulley 445 of transmission 430. The output speed and direction of transmission 430 may be controlled via mechanical linkage (not shown) connected between operator controls (not shown) and control arm 446. Optionally, an electrical linear or rotary actuator (not shown) may be employed in lieu of a mechanical linkage to operate (or replace in the case of a rotary actuator) control arm 446. As illustrated, a pulley 1106 may also be driven by output shaft 1107 to power a mowing deck (not shown) or other equipment (not shown) of vehicle 1110.

Figure 34:
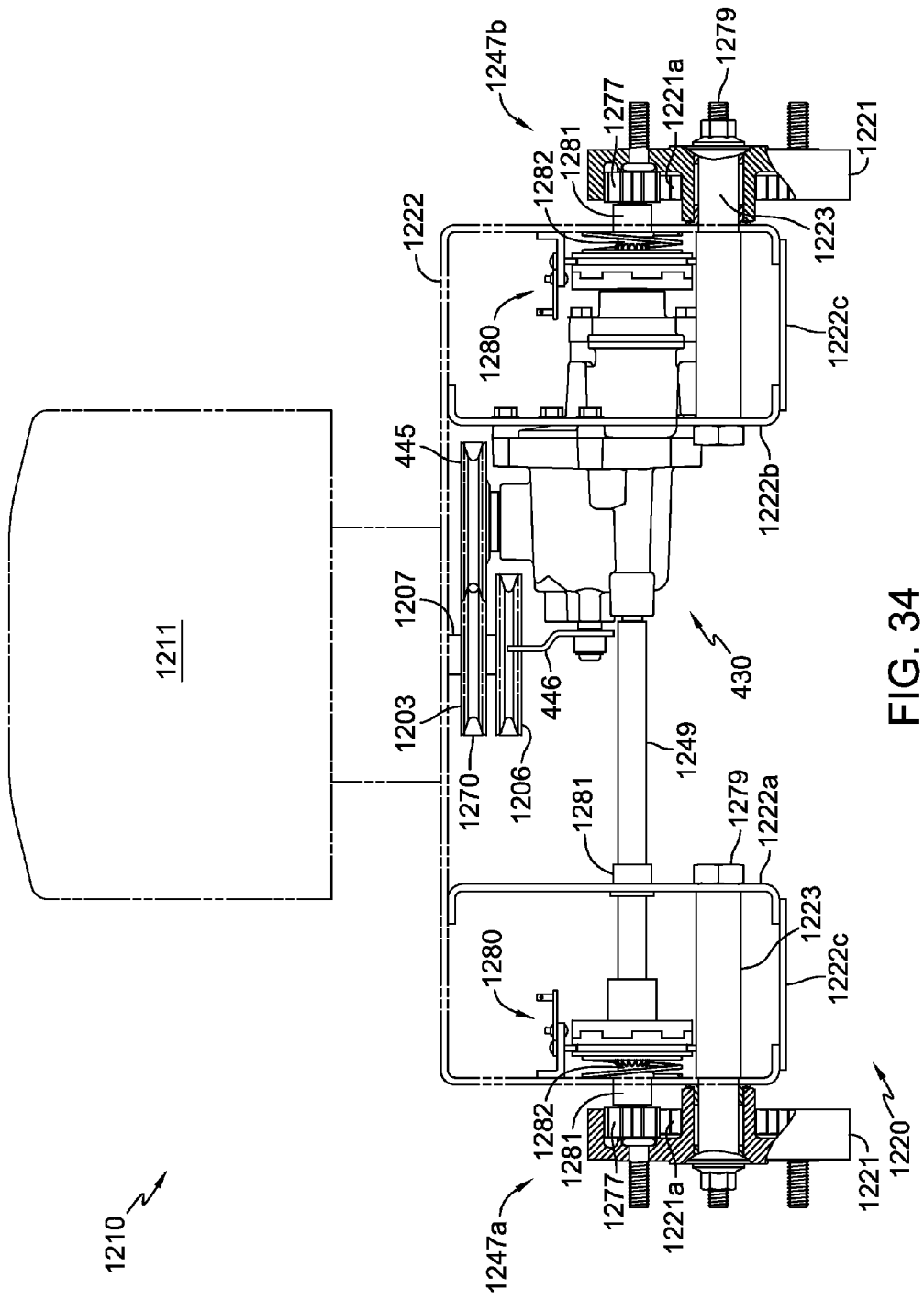
FIG. 34 is an elevational view of a twelfth configuration of a drive assembly similar to that of FIG. 33, having a pair of clutches located at the end of the output shaft and the end of the output shaft extension, respectively.

Referring now to FIG. 34, a twelfth configuration of a drive assembly 1220 is illustrated. This configuration differs materially from the eleventh configuration, drive assembly 1120, in only one respect. A pair of clutches 1280 similar in structure and function to those previously described for drive assembly 1020 have been interposed between transmission 430 and the respective single-stage reductions 1247a and 1247b, adding steering capability to a drive assembly having a single transmission 430.

A first clutch 1280 is engaged to an output shaft extension 1249 that cooperates with output through-shaft 437 at a first end, while a second clutch 1280, due to space limitations which eliminate the need for an output shaft extension, is directly connected to output through-shaft 437 at its other end (not shown). The structure and function of all sequentially labeled elements is as described for the corresponding elements of drive assembly 1120 and shall not further be described herein.

In this twelfth configuration, clutches 1280 may be selectively engaged and disengaged via operator controls and linkages (not shown) in order to steer vehicle 1210. When engaged, clutches 1280 permit transmission 430 to power a pair of clutch output shafts 1282 upon which pinion gears 1277 are rotatably fixed, thereby driving the single-stage reductions 1247a and 1247b, which incorporate wheel hubs 1221. Clutch output shafts 1282 are rotationally supported in bushings 1281. Additionally, both of the clutches 1280 may be disengaged at the same time in order to more easily move a temporarily unpowered vehicle 1210. That is, clutches 1280 may be employed in lieu of a hydraulic bypass assembly, such as block-lift bypass assembly 431 described herein previously, in order to preclude any hydraulic circuit resistance imparted by transmission 430 and allow relatively easy manual movement of vehicle 1210.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

What is claimed is:

1. A transmission for use in mobile power equipment, the transmission comprising:
    a housing having a first housing member connected to a second housing member along a joint to form a sump;
    an input shaft extending into the first housing member;
    a hydraulic mounting member disposed in the sump and comprising a first running surface having a first pair of ports and a second running surface having a second pair of ports in fluid communication with the first pair of ports;
    a pump rotatably disposed on the first running surface and engaged to and driven by the input shaft;
    a motor rotatably disposed on the second running surface of the hydraulic mounting member and in fluid communication with the pump, wherein the second running surface of the hydraulic mounting member is generally perpendicular to the first running surface of the hydraulic mounting member and lies between the pump and the motor, the second running surface having at least a first portion located above the first running surface;
    a pump displacement control mechanism rotatably supported in part by the hydraulic mounting member and in part by the first housing member, wherein the hydraulic mounting member rotatably supports the pump displacement control mechanism in a support surface formed opposite the first portion of the second running surface; and
    a motor shaft driven by the motor and having a proximal end rotatably supported by the second running surface and extending therethrough to overlap the support surface in the axial direction of the motor shaft, and a distal end.

2. The transmission of claim 1, further comprising a pair of bosses formed with the second running surface and an alignment member mating with corresponding surfaces formed in the first housing member, wherein the hydraulic mounting member is attached to the first housing member by a pair of fasteners, each fastener passing through a bore in one of the pair of bosses.

3. The transmission of claim 1, wherein the second running surface further comprises a second portion located below the first running surface.

4. The transmission of claim 1, wherein the distal end of the motor shaft extends out from the second housing member.

5. The transmission of claim 1, further comprising a sealing member located in the joint between the first housing member and the second housing member.

6. The transmission of claim 1, wherein the pump is an axial piston pump and the motor is an axial piston motor.

7. The transmission of claim 1, wherein an axis of rotation of the pump displacement control mechanism is generally parallel to an axis of rotation of the motor shaft, and the pump displacement control mechanism and the motor shaft overlap each other in the direction of these two axes of rotation.

8. The transmission of claim 7, wherein an axis of rotation of the input shaft lies within a common plane formed by the axis of rotation of the pump displacement control mechanism and the axis of rotation of the motor shaft.

9. The transmission of claim 1, further comprising a third housing member joined to the second housing member to form a gear chamber separate from the sump.

10. The transmission of claim 9, further comprising a reduction gear assembly disposed in the gear chamber and driven by the motor shaft.

11. The transmission of claim 10, further comprising an output shaft driven by the reduction gear assembly having a first end and a second end, wherein the output shaft is disposed generally parallel to the motor shaft and extends from the first housing member at the first end and extends from the third housing member at the second end.

12. The transmission of claim 9, further comprising an annular groove located at the joint between the first housing member and the second housing member and between a pair of sealing members, a first passage in fluid communication with the sump and the annular groove, and a second passage in fluid communication with the annular groove and the gear chamber, wherein the combination of the first passage, the annular groove and the second passage permit hydraulic fluid located in the sump to expand into the gear chamber.

13. A transmission, comprising:
a hydraulic mounting member comprising a first running surface, a support structure extending generally perpendicular to the first running surface, a second running surface formed on a first side of the support structure and in fluid communication with the first running surface, and a trunnion support formed in a second side of the support structure opposite the first side;
a pump rotatably disposed on the first running surface and engaged to and driven by an input shaft;
a motor rotatably disposed on the second running surface and in fluid communication with the pump, wherein the second running surface lies between the pump and the motor and has at least a first portion located above the first running surface; and
a pump displacement control mechanism comprising a trunnion rotatably supported by the trunnion support.

14. The transmission of claim 13, further comprising a motor shaft driven by the motor and having a proximal end rotatably supported by the support structure and extending through the second running surface to overlap the trunnion support in the axial direction of the motor shaft, and a distal end.

15. The transmission of claim 14, wherein an axis of rotation of the trunnion is generally parallel to an axis of rotation of the motor shaft, and at least a portion of the trunnion overlaps at least a portion of the motor shaft in the direction of these two axes of rotation.

16. The transmission of claim 15, wherein the input shaft has an axis of rotation that lies within a plane formed by the axis of rotation of the trunnion and the axis of rotation of the motor shaft.

17. The transmission of claim 13, wherein the second running surface further comprises a second portion located below the first running surface.

18. A transmission, comprising:
a housing forming a sump;
an input shaft extending into the housing;
a hydraulic mounting member disposed in the sump and comprising a first running surface, a support structure extending generally perpendicular to the first running surface, a second running surface formed on a first side of the support structure and in fluid communication with the first running surface, and a trunnion support formed in a second side of the support structure opposite the first side;
a pump rotatably disposed on the first running surface and engaged to and driven by the input shaft;
a motor rotatably disposed on the second running surface of the hydraulic mounting member and in fluid communication with the pump; and
a pump displacement control mechanism comprising a first trunnion disposed in and rotatably supported by the trunnion support, and a second trunnion disposed in and rotatably supported by the housing.

19. The transmission of claim 18, further comprising a trunnion pocket formed in the housing, wherein the second trunnion is disposed in and rotatably supported by the trunnion pocket.

20. The transmission of claim 19, further comprising a motor shaft driven by the motor and rotatably supported by the support structure, the motor shaft extending through the second running surface to overlap at least a portion of the first trunnion in the axial direction of the motor shaft.

* * * * *